US012567824B2

(12) United States Patent
Dai et al.

(10) Patent No.: US 12,567,824 B2
(45) Date of Patent: Mar. 3, 2026

(54) POWER CONVERTER FOR AN ELECTRICAL POWER SYSTEM

(71) Applicant: General Electric Company, Schenectady, NY (US)

(72) Inventors: Hang Dai, Niskayuna, NY (US); Kum Kang Huh, Niskayuna, NY (US); Rajib Datta, Niskayuna, NY (US); Cong Li, Niskayuna, NY (US); Vandana Prabhakar Rallabandi, Niskayuna, NY (US); Thomas Jahns, Madison, WI (US); Bulent Sarlioglu, Madison, WI (US)

(73) Assignee: General Electric Company, Schenectady, NY (US)

( * ) Notice: Subject to any disclaimer, the term of this patent is extended or adjusted under 35 U.S.C. 154(b) by 132 days.

(21) Appl. No.: 18/151,010

(22) Filed: Jan. 6, 2023

(65) Prior Publication Data

US 2024/0235452 A1 Jul. 11, 2024

(51) Int. Cl.
*H02M 1/00* (2007.01)
*B60L 50/00* (2019.01)
(Continued)

(52) U.S. Cl.
CPC .............. *H02P 27/08* (2013.01); *B60L 50/00* (2019.02); *B64D 27/24* (2013.01); *H02M 1/44* (2013.01);
(Continued)

(58) Field of Classification Search
CPC ...... H02P 27/08; B60L 50/00; B60L 2200/10; B60L 2210/40; B64D 27/24; H02M 1/44
(Continued)

(56) References Cited

U.S. PATENT DOCUMENTS 1,056,046 A 3/1913 Myers
6,208,098 B1 3/2001 Kume et al.
(Continued)

FOREIGN PATENT DOCUMENTS

CN 106329926 A 1/2017
KR 100831647 B1 5/2008
KR 101759060 B1 7/2017

OTHER PUBLICATIONS

Alcaide et al., "Common-Mode Voltage Mitigation of Dual Three-Phase Voltage Source Inverters in a Motor Drive Application", IEEE Access, USA, vol. 9, Apr. 13, 2021, pp. 67477-67487.
(Continued)

*Primary Examiner* — Rexford N Barnie
*Assistant Examiner* — Swarna N Chowdhuri
(74) *Attorney, Agent, or Firm* — Smith, Gambrell & Russell, LLP

(57) ABSTRACT

A power converter is provided. In one aspect, the power converter has a first inverter and a second inverter electrically coupled with one another and with a power bus. First switches of the first inverter are arranged symmetrically with second switches of the second inverter so that, when switched in a pulse width modulated switching scheme, the first switches generate a first common mode signal and the second switches generate a second common mode signal that is one hundred eighty degrees out of phase with the first common mode signal. In another aspect, the power converter includes a buck stage having one or more pairs of symmetrically arranged buck switches that can be controlled to reduce or eliminate common mode electromagnetic interference in the buck stage. The power converter can also include one or more pairs of symmetrically arranged inductors.

19 Claims, 19 Drawing Sheets

900
902

SWITCHING FIRST SWITCHES OF A FIRST INVERTER AND SECOND SWITCHES OF A SECOND INVERTER ELECTRICALLY COUPLED WITH THE FIRST INVERTER IN A PULSE WIDTH MODULATED SWITCHING SCHEME SO THAT THE FIRST SWITCHES ARE PULSE WIDTH MODULATED TO GENERATE A FIRST COMMON MODE SIGNAL AND SO THAT THE SECOND SWITCHES ARE PULSE WIDTH MODULATED TO GENERATE A SECOND COMMON MODE SIGNAL THAT IS ONE HUNDRED EIGHTY DEGREES OUT OF PHASE WITH THE FIRST COMMON MODE SIGNAL, THE FIRST SWITCHES OF THE FIRST INVERTER AND THE SECOND SWITCHES OF THE SECOND INVERTER BEING ARRANGED SYMMETRICALLY WITH RESPECT TO A CENTERLINE DEFINED BY THE POWER CONVERTER, THE FIRST INVERTER AND THE SECOND INVERTER TOGETHER FORMING AT LEAST PART OF A BOOST STAGE OF THE POWER CONVERTER

904

SWITCHING A FIRST BUCK SWITCH AND A SECOND BUCK SWITCH IN THE PULSE WIDTH MODULATED SWITCHING SCHEME SO THAT THE FIRST BUCK SWITCH IS PULSE WIDTH MODULATED TO GENERATE A FIRST BUCK COMMON MODE SIGNAL AND SO THAT THE SECOND BUCK SWITCH IS PULSE WIDTH MODULATED TO GENERATE A SECOND BUCK COMMON MODE SIGNAL THAT IS ONE HUNDRED EIGHTY DEGREES OUT OF PHASE WITH THE FIRST BUCK COMMON MODE SIGNAL, THE FIRST BUCK SWITCH AND THE SECOND BUCK SWITCH FORMING AT LEAST A PART OF A BUCK STAGE THAT IS ELECTRICALLY COUPLED WITH THE BOOST STAGE

(51) Int. Cl.

| | |
|---|---|
| *B64D 27/24* | (2006.01) |
| *H02M 1/44* | (2007.01) |
| *H02M 7/493* | (2007.01) |
| *H02P 27/08* | (2006.01) |

(52) U.S. Cl.
CPC ....... *B60L 2200/10* (2013.01); *B60L 2210/40* (2013.01); *B64D 2221/00* (2013.01)

(58) Field of Classification Search
USPC .......................................................... 307/9.1
See application file for complete search history.

(56) References Cited

U.S. PATENT DOCUMENTS

| | | | |
|---|---|---|---|
| 8,488,340 | B2 | 7/2013 | Zhang et al. |
| 8,760,128 | B2 | 6/2014 | Xu et al. |
| 9,178,427 | B1 | 11/2015 | Szolusha |
| 9,372,493 | B2 | 6/2016 | Aiello et al. |
| 9,455,646 | B2 | 9/2016 | Zhou et al. |
| 9,520,800 | B2 | 12/2016 | Tian et al. |
| 9,800,133 | B2 | 10/2017 | Klotz et al. |
| 9,917,543 | B1 | 3/2018 | Sarlioglu et al. |
| 9,977,858 | B2 | 5/2018 | Solodovnik et al. |
| 10,312,798 | B2 | 6/2019 | Green et al. |
| 10,476,372 | B2 | 11/2019 | Dai et al. |
| 10,498,244 | B2 | 12/2019 | Horwitz et al. |
| 11,095,202 | B1 | 8/2021 | Li et al. |
| 2009/0251000 | A1* | 10/2009 | Su ........................... B60L 58/33 |
| | | | 307/9.1 |
| 2009/0302686 | A1 | 12/2009 | Fishman |
| 2017/0070175 | A1* | 3/2017 | Butzmann ........... H02M 7/5387 |
| 2019/0149078 | A1* | 5/2019 | Sumasu .................. H02M 1/44 |
| | | | 318/400.02 |
| 2019/0341841 | A1 | 11/2019 | Dickey |
| 2022/0371532 | A1* | 11/2022 | Huh ........................ H02J 3/381 |
| 2023/0365013 | A1* | 11/2023 | Hatano ................... B60L 50/51 |

OTHER PUBLICATIONS

Salem et al., "Offline-Based SVM Techniques to Reduce Common-Mode Voltage of Six-Phase Cascaded-CSI", IEEE Open Journal of Power Electronics, IEEE, vol. 3, Jul. 21, 2022, pp. 521-534.

Vincenzo et al., "The rebirth of the Current Source Inverter: advantages for aerospace motor design", IEEE Industrial Electronic Magazine, vol. 13, No. 4, Dec. 2019, pp. 65-76.

Wu et al., "Current-Source Converter and Cycloconverter Topologies for Industrial Medium-Voltage Drives", IEEE Transactions on Industrial Electronics, vol. 55, No. 7, Jul. 2008, pp. 2786-2797.

Ding et al., Common-Mode Voltage Reduction for Parallel CSC-Fed Motor Drives with Multilevel Modulation, IEEE Transactions on Power Electronics, vol. 33, Issue 8, Aug. 2018, pp. 6555-6566. (Abstract Only) https://ieeexplore.ieee.org/abstract/document/8046060.

Golovanov et al., 4-MW Class High-Power-Density Generator for Future Hybrid-Electric Aircraft, IEEE Transactions on Transportation Electrification, vol. 7, Issue 4, Dec. 2021, pp. 2952-2964. (Abstract Only) https://ieeexplore.ieee.org/document/9387358.

Guacci et al., Three-Phase Two-Third-PWM Buck-Boost Current Source Inverter System Employing Dual-Gate Monolithic Bidirectional GaN e-EFTs, CPSS Transactions on Power Electronics and Applications, vol. 4, Issue 4, Dec. 2019, pp. 339-354. https://ieeexplore.ieee.org/stamp/stamp.jsp?tp=&arnumber=8950942.

He et al., SVM Strategies for Simultaneous Common-Mode Voltage Reduction and DC Current Balancing in Parallel Current Source Converters, IEEE Transactions on Power Electronics, vol. 33, Issue 10, Oct. 2018, pp. 8859-8871. (Abstract Only) https://ieeexplore.ieee.org/document/8165966.

Imaie et al., Control Strategies for Multiple Parallel Current-Source Converters of SMES System, IEEE Transactions on Power Electronics, vol. 15, Issue 2, Mar. 2000, pp. 377-385. (Abstract Only) https://ieeexplore.ieee.org/document/838111.

Lee et al., Wind Power Collection and Transmission with Series Connected Current Source Converters, Proceedings of the 2011 14th European Conference on Power Electronics and Applications, 2011, pp. 1-10. (Abstract Only) https://ieeexplore.ieee.org/document/6020678.

Madonna et al., The Rebirth of the Current Source Inverter: Advantages for Aerospace Motor Design, IEEE Industrial Electronics Magazine, vol. 13, Issue 4, Dec. 2019, pp. 65-46. (Abstract Only) https://ieeexplore.ieee.org/document/8939276.

Popat et al., Coordinated Control of Cascaded Current-Source Converter Based Offshore Wind Farm, IEEE Transactions on Sustainable Energy, vol. 3, Issue 3, Jul. 2012, pp. 557-565. (Abstract Only) https://ieeexplore.ieee.org/document/6193201.

Wang et al., Zero-Voltage-Switching Current Source Inverter Fed PMSM Drives with Reduced EMI, IEEE Transactions on Power Electronics, vol. 36, Issue 1, Jan. 2021, pp. 761-771. (Abstract Only) https://ieeexplore.ieee.org/document/9124700.

Wu et al., High-Performance Permanent Magnet Machine Drive for Electric Vehicle Applications Using a Current Source Inverter, 2008 34th Annual Conference of IEEE Industrial Electronics, 2008, pp. 2812-2817. (Abstract Only) https://ieeexplore.ieee.org/document/4758404.

Xu et al., A Medium Voltage AC Drive with Parallel Current Source Inverters for High Power Applications, 2005 IEEE 36th Power Electronics Specialists Conference, Jun. 16, 2005. (Abstract Only) https://ieeexplore.ieee.org/abstract/document/1581949.

Xu et al., A Soft-Switching Current-Source-Inverter-Fed Motor Drive with Reduced Common-Mode Voltage, IEEE Transactions on Industrial Electronics, vol. 68, Issue 4, Apr. 2021, pp. 3012-3021. Abstract Only https://ieeexplore.ieee.org/document/9032358.

\* cited by examiner

800 — 802

SWITCHING FIRST SWITCHES OF A FIRST INVERTER AND SECOND SWITCHES OF A SECOND INVERTER ELECTRICALLY COUPLED WITH THE FIRST INVERTER IN A PULSE WIDTH MODULATED SWITCHING SCHEME SO THAT THE FIRST SWITCHES ARE PULSE WIDTH MODULATED TO GENERATE A FIRST COMMON MODE SIGNAL AND SO THAT THE SECOND SWITCHES ARE PULSE WIDTH MODULATED TO GENERATE A SECOND COMMON MODE SIGNAL THAT IS ONE HUNDRED EIGHTY DEGREES OUT OF PHASE WITH THE FIRST COMMON MODE SIGNAL, THE FIRST SWITCHES OF THE FIRST INVERTER AND THE SECOND SWITCHES OF THE SECOND INVERTER BEING ARRANGED SYMMETRICALLY WITH RESPECT TO A CENTERLINE DEFINED BY THE POWER CONVERTER

SWITCHING FIRST SWITCHES OF A FIRST INVERTER AND SECOND SWITCHES OF A SECOND INVERTER ELECTRICALLY COUPLED WITH THE FIRST INVERTER IN A PULSE WIDTH MODULATED SWITCHING SCHEME SO THAT THE FIRST SWITCHES ARE PULSE WIDTH MODULATED TO GENERATE A FIRST COMMON MODE SIGNAL AND SO THAT THE SECOND SWITCHES ARE PULSE WIDTH MODULATED TO GENERATE A SECOND COMMON MODE SIGNAL THAT IS ONE HUNDRED EIGHTY DEGREES OUT OF PHASE WITH THE FIRST COMMON MODE SIGNAL, THE FIRST SWITCHES OF THE FIRST INVERTER AND THE SECOND SWITCHES OF THE SECOND INVERTER BEING ARRANGED SYMMETRICALLY WITH RESPECT TO A CENTERLINE DEFINED BY THE POWER CONVERTER, THE FIRST INVERTER AND THE SECOND INVERTER TOGETHER FORMING AT LEAST PART OF A BOOST STAGE OF THE POWER CONVERTER

904

SWITCHING A FIRST BUCK SWITCH AND A SECOND BUCK SWITCH IN THE PULSE WIDTH MODULATED SWITCHING SCHEME SO THAT THE FIRST BUCK SWITCH IS PULSE WIDTH MODULATED TO GENERATE A FIRST BUCK COMMON MODE SIGNAL AND SO THAT THE SECOND BUCK SWITCH IS PULSE WIDTH MODULATED TO GENERATE A SECOND BUCK COMMON MODE SIGNAL THAT IS ONE HUNDRED EIGHTY DEGREES OUT OF PHASE WITH THE FIRST BUCK COMMON MODE SIGNAL, THE FIRST BUCK SWITCH AND THE SECOND BUCK SWITCH FORMING AT LEAST A PART OF A BUCK STAGE THAT IS ELECTRICALLY COUPLED WITH THE BOOST STAGE

FIG. 19

POWER CONVERTER FOR AN ELECTRICAL POWER SYSTEM

FEDERALLY SPONSORED RESEARCH

This invention was made with Government support under contract number DE-AR0001353 awarded by the Department of Energy. The Government has certain rights in this invention.

FIELD

The present subject matter relates generally to electrical power systems for vehicles, such as aircraft.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft.

More recently, hybrid-electric and fully-electric propulsion systems have been developed for aircraft. With such propulsion systems, electrical power from one or more electric power sources may be provided to one or more electric machines to drive one or more fans to produce thrust. One or more power converters can control the electrical power provided to the one or more electric machines. Common mode electromagnetic interference, which is generally undesirable, may be generated by the one or more power converters during operation.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 18 is a flow diagram for a method of operating a power converter of an electrical power system according to an example embodiment of the present disclosure;

FIG. 19 is a flow diagram for a method of operating a buck-boost power converter of an electrical power system according to an example embodiment of the present disclosure.

DETAILED DESCRIPTION

Figure 1:
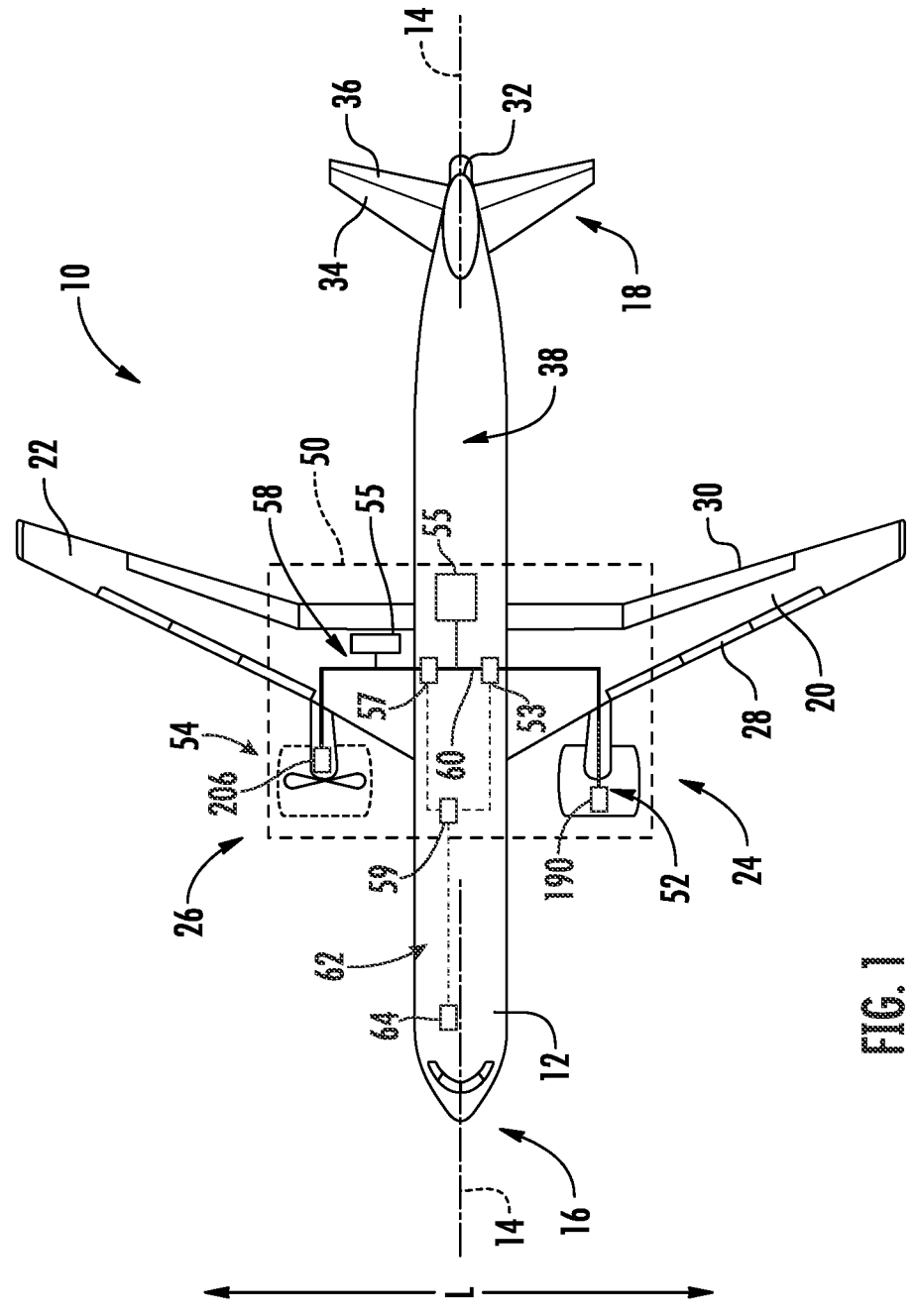
FIG. 1 is a schematic top view of an aircraft according to various example embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Hybrid-electric and fully-electric propulsion systems are being developed for aircraft. With such propulsion systems, electrical power from one or more electric power sources may be provided to one or more electric machines to drive one or more fans to produce thrust. One or more power converters can control the electrical power provided to the one or more electric machines. Common mode Electromagnetic Interference (EMI), which is generally undesirable, may be generated by the one or more power converters during operation. Indeed, common mode EMI can be dangerous. Conventionally, EMI filters have been employed to reduce common mode EMI to acceptable limits. However, EMI filters can be bulky and heavy. In some instances, EMI filters of current state-of-the-art power converters can occupy up to thirty to fifty percent (30-50%) of the total volume of a power converter.

In accordance with the inventive aspects of the present disclosure, various power converter topologies and switching schemes therefore are provided herein that reduce common mode EMI generation. Accordingly, with the power converters and switching schemes disclosed herein, EMI filters can be eliminated or reduced, thereby enabling high power density power converters. High power density power converters are useful in many industries, including the aviation industry. Further, the architecture of the power converters disclosed herein may provide a power converter with a higher fault tolerance than conventional power converters. Other advantages, benefits, and technical effects may be provided by the power converter topologies and switching schemes disclosed herein.

In a first example aspect, a power converter for an electrical power system is provided. The power converter is electrically coupled with a power source, such as a current source, and a load, such as an electric machine. The power converter includes a first inverter and a second inverter electrically coupled with one another. The first inverter and the second inverter can both be current source inverters. The first inverter has a plurality of first switches and the second inverter has a plurality of second switches. The first switches and the second switches are symmetrically arranged with respect to a centerline defined by the power converter. That is, the position of a given first switch mirrors the position of a corresponding second switch with respect to a centerline defined by the power converter. For instance, the first switches of the first inverter can include a first, a second, a third, a fourth, a fifth, and a sixth switch. Likewise, the second switches of the second inverter can include a first, a second, a third, a fourth, a fifth, and a sixth switch. The position of the first switch of the first switches can mirror the position of the first switch of the second switches, the position of the second switch of the first switches can mirror the position of the second switch of the second switches, the position of the third switch of the first switches can mirror the position of the third switch of the second switches, and so on.

With the first and second switches symmetrically arranged, one or more processors associated with the power converter can be configured to cause the first and second switches to switch in a pulse width modulated switching scheme so that the first switches of the first inverter are pulse width modulated to generate a first common mode signal and so that the second switches of the second inverter are pulse width modulated to generate a second common mode signal that is one hundred eighty degrees (180°) out of phase with the first common mode signal. Thus, the first and second common mode signals can cancel each other. In this regard, the synchronized pulse width modulation of the first and second switches allows for cancelation or reduction in common mode EMI generation.

In a second example aspect, a buck-boost power converter for an electrical power system is provided. The buck-boost power converter is electrically coupled with a power source, such as a voltage source, and a load, such as an electric machine. The buck-boost power converter includes a buck stage to "buck down" the voltage and a boost stage to "boost up" the voltage. The boost stage can include a first inverter and a second inverter electrically coupled with one another. The first inverter and the second inverter can both be current source inverters. The first inverter has a plurality of first switches and the second inverter has a plurality of second switches. The first switches and the second switches are symmetrically arranged with respect to a centerline defined by the power converter. The buck stage electrically coupled with the boost stage can include one or more pairs of buck switches. The buck switches of each pair are symmetrically arranged such that one buck switch of a pair mirrors the position of the other buck switch of the pair with respect to a centerline defined by the power converter.

With the first and second switches of the boost stage symmetrically arranged and the buck switches of the buck stage symmetrically arranged, one or more processors associated with the buck-boost power converter can be configured to cause the buck switches to switch according to a pulse width modulated switching scheme so that one buck switch of a given pair is pulse width modulated to generate a first buck common mode signal and so that the other buck switch of the given pair is pulse width modulated to generate a second buck common mode signal that is one hundred eighty degrees (180°) out of phase with the first buck common mode signal. Thus, the common mode signals of the buck stage can cancel each other.

Similarly, the one or more processors can be configured to cause the first and second switches to switch in the pulse width modulated switching scheme so that the first switches of the first inverter are pulse width modulated to generate a first common mode signal and so that the second switches of the second inverter are pulse width modulated to generate a second common mode signal that is one hundred eighty degrees (180°) out of phase with the first common mode signal. Thus, the common mode signals of the boost stage can cancel each other. Accordingly, common mode EMI can be eliminated or reduced in both the buck and the boost stage of the buck-boost power converter.

In a third example aspect, a buck-boost power converter for an electrical power system is provided. The buck-boost power converter is electrically coupled with a power source, such as a voltage source, and a load, such as an electric machine. The buck-boost power converter includes a buck stage and a boost stage electrically coupled with the buck stage. The buck stage can be arranged in the manner noted above with respect to the second example aspect. One or more processors associated with the buck-boost power converter can be configured to cause the buck switches to switch according to a pulse width modulated switching scheme so that one buck switch of a given pair is pulse width modulated to generate a first buck common mode signal and so that the other buck switch of the given pair is pulse width modulated to generate a second buck common mode signal that is one hundred eighty degrees (180°) out of phase with the first buck common mode signal. Thus, the common mode signals of the buck stage can cancel each other. Accordingly, common mode EMI associated with the buck stage can be canceled or reduced. In the third example aspect, rather than both the buck and boost stages including common EMI cancelation or reduction features, only the buck stage includes common EMI cancelation or reduction features.

In addition, one or more pairs of symmetrically arranged inductors can be positioned along DC-links of the electrical power system of the first, second, and/or third example aspect noted above. The symmetrically arranged pairs of inductors can smooth the flow of electric current to the inverters, buck switches, etc., and notably, the one or more pairs of symmetrically arranged inductors can facilitate reduction or elimination of common mode EMI.

Referring now to the drawings, wherein identical numerals indicate the same elements throughout the figures, FIG. 1 provides a top view of an aircraft 10 as may incorporate various embodiments of the present disclosure. As shown in FIG. 1, the aircraft 10 defines a longitudinal centerline 14 that extends therethrough and a lateral direction L. The aircraft 10 extends between a forward end 16 and an aft end 18, e.g., along a longitudinal direction parallel to the longitudinal centerline 14.

The aircraft 10 includes a fuselage 12 extending longitudinally from the forward end 16 to the aft end 18 of the aircraft 10. The fuselage 12 has a port side and a starboard side. The aircraft 10 also includes a wing assembly. More specifically, the wing assembly includes a first, port side wing 20 and a second, starboard side wing 22. The first and second wings 20, 22 each extend laterally outward from the fuselage 12 along the lateral direction L with respect to the longitudinal centerline 14. The first wing 20 and a portion of the fuselage 12 together define a first side 24 of the aircraft 10. The second wing 22 and another portion of the fuselage 12 together define a second side 26 of the aircraft 10. For the embodiment of FIG. 1, the first side 24 of the aircraft 10 is configured as the port side of the aircraft 10, and the second side 26 of the aircraft 10 is configured as the starboard side of the aircraft 10.

Each one of the wings 20, 22 includes one or more leading edge flaps 28 and one or more trailing edge flaps 30. The aircraft 10 further includes a vertical stabilizer 32 having a rudder flap for yaw control, and a pair of horizontal stabilizers 34, each having an elevator flap 36 for pitch control. The fuselage 12 additionally includes an outer surface or skin 38. It should be appreciated that the aircraft 10 of FIG. 1 is provided for example purposes and that the inventive aspects of the present disclosure apply to aircraft having other configurations.

Figure 2:
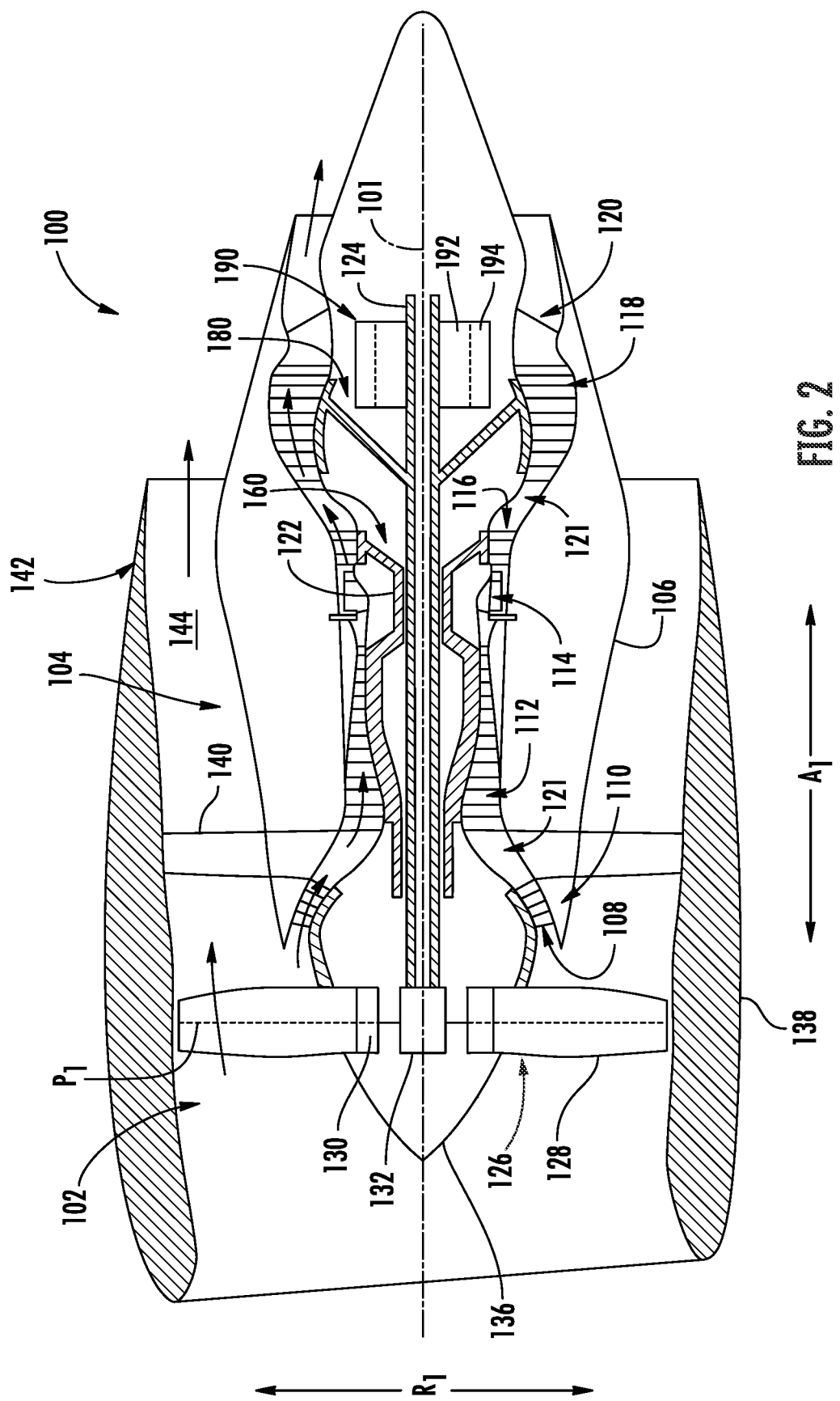
FIG. 2 is a schematic, cross-sectional view of a gas turbine engine of the aircraft of FIG. 1.
Figure 3:
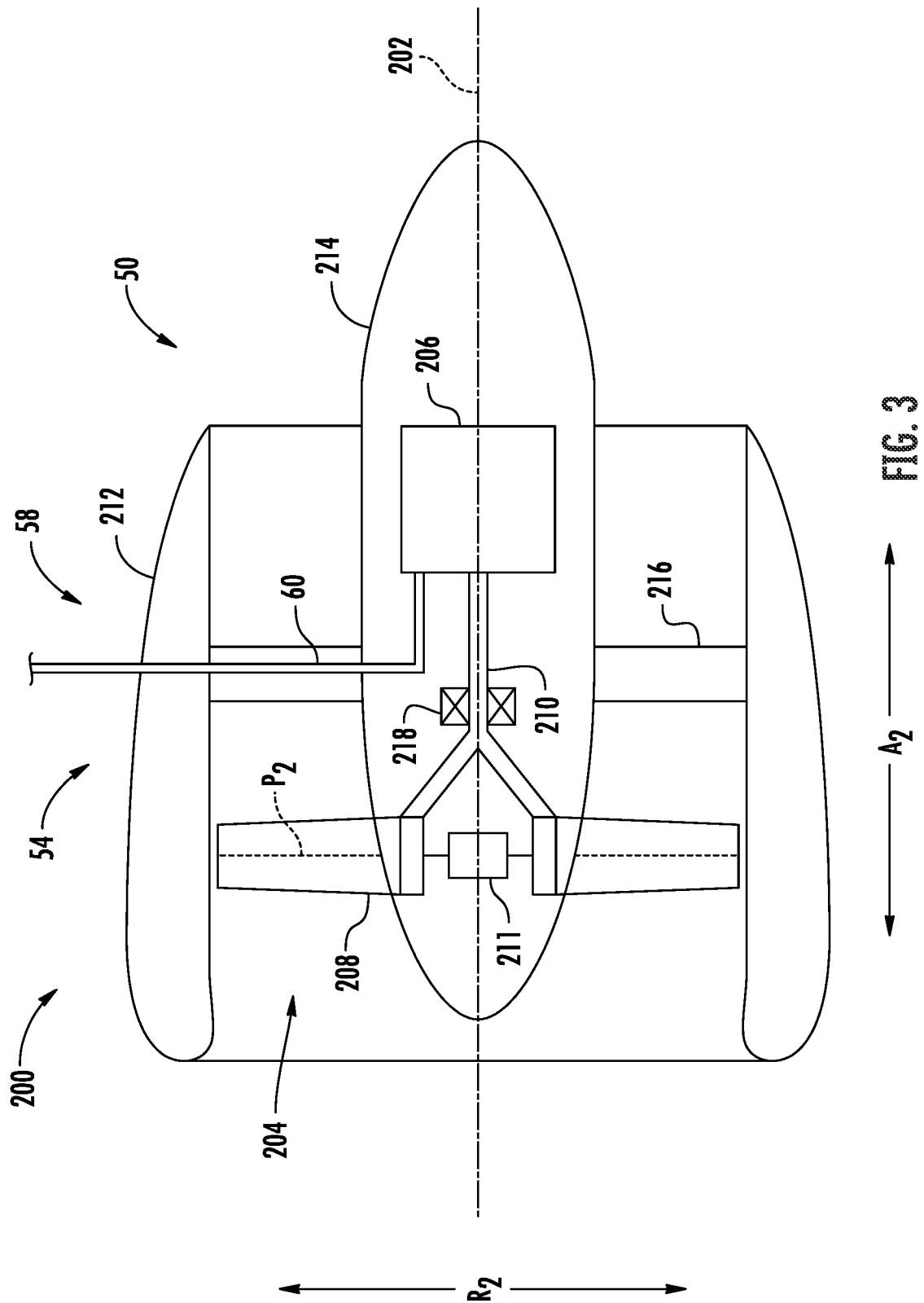
FIG. 3 is a schematic, cross-sectional view of an electric fan assembly of the aircraft of FIG. 1.

Referring now to FIGS. 2 and 3 in addition to FIG. 1, the aircraft 10 of FIG. 1 additionally includes a propulsion system 50 having a first propulsor assembly 52 and a second propulsor assembly 54. FIG. 2 provides a schematic, cross-sectional view of the first propulsor assembly 52. FIG. 3 provides a schematic, cross-sectional view of the second propulsor assembly 54. As depicted in FIG. 1, the first propulsor assembly 52 and second propulsor assembly 54 are both configured as under-wing mounted propulsor assemblies.

Referring particularly to FIGS. 1 and 2, the first propulsor assembly 52 is mounted, or configured to be mounted, to the first side 24 of the aircraft 10, or more particularly, to the first wing 20 of the aircraft 10. For this embodiment, the first propulsor assembly 52 is a turbofan engine 100. As shown in FIG. 2, the turbofan engine 100 defines an axial direction A1 (extending parallel to a longitudinal centerline 101 provided for reference), a radial direction R1, and a circumferential direction (extending about the axial direction A1; not depicted in FIG. 2). The turbofan engine 100 includes a fan section 102 and a core turbine engine 104 disposed downstream of the fan section 102.

The core turbine engine 104 includes an engine cowl 106 that defines an annular core inlet 108. The engine cowl 106 encases, in a serial flow relationship, a compressor section including a booster or low pressure compressor (or LP compressor 110) and a high pressure compressor (or HP compressor 112); a combustion section 114; a turbine section including a high pressure turbine (or HP turbine 116) and a low pressure turbine (or LP turbine 118); and a jet exhaust nozzle section 120. The compressor section, combustion section 114, turbine section, and jet exhaust nozzle section 120 together define a core air flowpath 121 extending from the annular core inlet 108 through the LP compressor 110, HP compressor 112, combustion section 114, HP turbine 116, LP turbine 118, and jet exhaust nozzle section 120. A high pressure shaft (or HP shaft 122) drivingly connects the HP turbine 116 to the HP compressor 112. The HP shaft 122 and rotating components of the HP compressor 112 and the HP turbine 116 that are mechanically coupled with the HP shaft 122 collectively form a high pressure spool (or HP spool 160). A low pressure shaft (or LP shaft 124) drivingly connects the LP turbine 118 to the LP compressor 110. The LP shaft 124 and rotating components of the LP compressor 110 and the LP turbine 118 that are mechanically coupled with the LP shaft 124 collectively form a low pressure spool (or LP spool 180).

The fan section 102 may include a fixed or variable pitch fan 126 having a plurality of fan blades 128 coupled to a disk 130 in a spaced apart manner. As depicted, the fan blades 128 extend outward from the disk 130 generally along the radial direction R1. For the variable pitch fan 126 of FIG. 2, each fan blade 128 is rotatable relative to the disk 130 about a pitch axis P1 by virtue of the fan blades 128 being mechanically coupled to an actuation member 132 configured to collectively vary the pitch of the fan blades 128 in unison. The fan blades 128, disk 130, and actuation member 132 are together rotatable about the longitudinal centerline 14 by the LP spool 180. As noted above, in some embodiments, the fan blades 128 may be fixed and not rotatable about their respective pitch axes. Further, in other embodiments, the LP spool 180 may be mechanically coupled with the fan 126 via a gearbox.

Referring still to FIG. 2, the disk 130 is covered by a spinner or rotatable front hub 136 aerodynamically contoured to promote an airflow through the plurality of fan blades 128. Additionally, the fan section 102 includes an outer nacelle 138 that circumferentially surrounds the fan 126 and/or at least a portion of the core turbine engine 104. The nacelle 138 is supported relative to the core turbine engine 104 by a plurality of circumferentially-spaced outlet guide vanes 140. A downstream section 142 of the nacelle 138 extends over an outer portion of the core turbine engine 104 so as to define a bypass passage 144 therebetween.

It should also be appreciated that the turbofan engine 100 depicted in FIG. 2 is provided for example purposes and is not intended to be limiting. In other embodiments, the turbofan engine 100 may have other configurations. For example, in other embodiments, the turbofan engine 100 may be configured as a turboprop engine, a turbojet engine, a differently configured turbofan engine, or an unducted turbofan engine (e.g., without the nacelle 138, but including the stationary outlet guide vanes 140). For example, the gas turbine engine may be a geared gas turbine engine (e.g., having a reduction gearbox between the LP shaft 124 and fan 126), may have any other suitable number or configuration of shafts/spools (e.g., may include an intermediate speed shaft/turbine/compressor), etc.

In addition, as depicted in FIG. 2, the turbofan engine 100 includes one or more electric machines, including an electric machine 190. For this embodiment, the electric machine 190 is mechanically coupled with the LP spool 180. Particularly, for this embodiment, the electric machine 190 is directly mechanically coupled to the LP shaft 124. In other embodiments, the electric machine 190 can be indirectly mechanically coupled to the LP shaft 124, e.g., via a gearbox.

The electric machine 190 includes a rotor 192 and a stator 194. The rotor 192 is rotatable with the LP shaft 124. The stator 194 includes electric current-carrying elements, such as windings or coils. In this manner, electrical power can be transmitted to the electric current-carrying elements, and as will be appreciated, electrical energy can be converted into mechanical energy in a motoring mode or vice versa in a generating mode as the rotor 192 rotates relative to the stator

194. The rotor 192 has rotor components for creating a rotor magnetic field in order to couple to the stator magnetic field to enable energy conversion. The rotor components of the rotor 192 can be, without limitation, rotor magnets in case of a permanent magnet synchronous machine, a squirrel cage in case of an induction machine, or a field winding in case of a field wound synchronous machine.

In addition, for this embodiment, the electric machine 190 is operable in a motoring mode as an electric motor and in a generating mode as an electric generator. However, in alternative embodiments, the electric machine 190 may be configured only as an electric motor or only as an electric generator.

Referring still to FIGS. 1 and 2, the propulsion system 50 includes an electric power distribution system 58 to allow the electric machine 190 to be electrically coupled with other electrically-driven components of the turbofan engine 100, as well as to other components of the propulsion system 50 and/or the aircraft 10. For the embodiment depicted, the electric power distribution system 58 includes a power bus formed of one or more electrical cables or lines 60 along which electrical power can be directed.

In addition, the propulsion system 50 further includes one or more energy storage devices 55 (such as one or more batteries or other electrical energy storage devices) electrically coupled to the electric power distribution system 58 for, e.g., providing electrical power to the second propulsor assembly 54 and/or receiving electrical power from an electric generator thereof. Inclusion of the one or more energy storage devices 55 may provide performance gains, and may increase a propulsion capability of the propulsion system 50 during, e.g., transient operations.

Referring now particularly to FIGS. 1 and 3, the second propulsor assembly 54 is spaced apart from the first propulsor assembly 52. As depicted, the second propulsor assembly 54 is mounted to the second side 26 of the aircraft 10, or more particularly, to the second wing 22 of the aircraft 10. As shown in FIG. 3, the second propulsor assembly 54 is generally configured as an electric propulsion assembly 200 that includes an electric motor and a propulsor. More particularly, for the embodiment depicted in FIG. 3, the electric propulsion assembly 200 includes an electric machine 206 and a propulsor or fan 204. The electric propulsion assembly 200 defines an axial direction A2 extending along a longitudinal centerline axis 202 that extends therethrough for reference, as well as a radial direction R2. The fan 204 is rotatable about the centerline axis 202 by the electric machine 206 when operating in a drive or motoring mode.

The fan 204 includes a plurality of fan blades 208 and a fan shaft 210. The plurality of fan blades 208 are attached to/rotatable with the fan shaft 210 and spaced apart from one another generally along a circumferential direction of the fan 204. In certain embodiments, the plurality of fan blades 208 may be attached in a fixed manner to the fan shaft 210, or alternatively, the plurality of fan blades 208 may be rotatable about respective pitch axes such as in the embodiment depicted. For example, the plurality of fan blades 208 each define a respective pitch axis P2 and are attached to the fan shaft 210 such that a pitch of each of the plurality of fan blades 208 may be changed, e.g., in unison, by a pitch change mechanism 211. Changing the pitch of the plurality of fan blades 208 may increase an efficiency of the second propulsor assembly 54 and/or may allow the second propulsor assembly 54 to achieve a desired thrust profile. With such an embodiment, the fan 204 may be referred to as a variable pitch fan.

Moreover, for the embodiment depicted in FIG. 3, the electric propulsion assembly 200 includes an outer nacelle 212 attached to a core 214 of the fan 204 through one or more struts or outlet guide vanes 216. The outer nacelle 212 substantially completely surrounds the fan 204, and particularly the plurality of fan blades 208. Accordingly, for the embodiment depicted in FIG. 3, the fan 204 may be referred to as a ducted electric fan. In other embodiments, the fan 204 can be unducted.

Referring still particularly to FIG. 3, the fan shaft 210 is mechanically coupled to the electric machine 206 within the core 214, such that the electric machine 206 drives the fan 204 through the fan shaft 210. The fan shaft 210 is supported by one or more bearings 218, such as one or more roller bearings, ball bearings, or any other suitable bearings. Additionally, the electric machine 206 may be an inrunner electric motor (i.e., including a rotor positioned radially inward of a stator), or alternatively may be an outrunner electric motor (i.e., including a stator positioned radially inward of a rotor).

Electric power sources, such as the electric machine 190 of the first propulsor assembly 52 (when operating in a generating mode) and/or the one or more energy storage devices 55 can be electrically connected with the electric machine 206 for providing electrical power thereto. More particularly, the electric machine 206 of the electric propulsion assembly 200 is electrically coupled with such electrical power sources through the electric power distribution system 58, and more particularly through the one or more electrical cables or lines 60 extending therebetween.

As further shown in FIG. 1, the electric power distribution system 58 of the propulsion system 50 includes power converters for controlling, converting, and/or conditioning electrical power distributed to various electrical components of the propulsion system 50 and/or aircraft loads. For instance, a first power converter 53 electrically coupled with the electric machine 190 of the first propulsor assembly 52 can control transmission of electrical power to or from the electric machine 190. Moreover, a second power converter 57 electrically coupled with the electric machine 206 of the second propulsor assembly 54 can control transmission of electrical power to or from the electric machine 206. For instance, based on a thrust demand, the second power converter 57 can convert direct current (DC) electrical power provided by the one or more energy storage devices 55 into alternating current (AC) electrical power, and can control the AC electrical power provided to the electric machine 206. The AC electrical power can excite the current-carrying elements of the electric machine 206, which ultimately causes the electric machine 206 to drive the fan shaft 210, which in turn drives the fan 204 to produce thrust. Alternatively, ram air can drive the fan 204, which in turn may cause the electric machine 206 to generate AC electrical power. The second power converter 57 can convert the AC electrical power to DC electrical power, which can then be distributed to one or more electrical loads, such as the one or more energy storage devices 55.

The first and second power converters 53, 57 can be controlled by a supervisor controller 59. The first and second power converters 53, 57 can each include a controller operable to receive inputs from the supervisor controller 59, and based on such inputs, the controllers can cause switching devices of the converters 53, 57 to perform a duty cycle, for example. As shown in FIG. 1, the first and second power converters 53, 57 are depicted as being communicatively coupled with the supervisor controller 59.

As further shown in FIG. 1, the supervisor controller 59 can form a part of a computing system 62 of the aircraft 10. The computing system 62 of the aircraft 10 can include one or more processors and one or more memory devices embodied in one or more computing devices. For instance, as depicted in FIG. 1, the computing system 62 includes the supervisor controller 59 as well as other computing devices, such as a computing device 64 positioned in the cockpit or avionics bay, an engine controller associated with the turbofan engine 100 (FIG. 2), the controllers of the first and second power converters 53, 57, etc. The computing system 62 can include other computing devices as well. The computing devices of the computing system 62 can be communicatively coupled with one another via a communication network including one or more wired and/or wireless communication links.

A propulsion system in accordance with one or more of the above embodiments may be referred to as a gas-electric, or hybrid-electric propulsion system, given that the first propulsor assembly 52 is configured as a gas turbine engine having one or more electric machines and the second propulsor assembly 54 is configured as an electrically-driven fan. It should be appreciated that, in other embodiments, the propulsion system 50 may have other configurations, and further, may be integrated into an aircraft 10 in other suitable manners. For example, in other embodiments, the hybrid-electric propulsion system may have any number of gas turbine engines (such as one, two, three, four, etc.) distributed in a suitable manner (such as along a port side wing, a starboard side wing, a fuselage of the aircraft, an aft location, etc.), and mounted in any suitable manner (such as in an under-wing mount, an over-wing mount, integrated into a wing, mounted to a fuselage of the aircraft, mounted to a stabilizer of the engine, mounted at the aft end as a boundary layer ingestion engine, etc.). Similarly, the hybrid-electric propulsion system may have any suitable number of electric propulsion engines (such as one, two, three, four, etc.) distributed in any suitable manner (such as along a port side wing, a starboard side wing, a fuselage of the aircraft, an aft location, etc.), and mounted in any suitable manner (such as in an under-wing mount, an over-wing mount, integrated into a wing, mounted to a fuselage of the aircraft, mounted to a stabilizer of the engine, mounted at the aft end as a boundary layer ingestion engine, etc.). In the event a plurality of gas turbine engines are provided with electric machine to generate electrical power, each may be directed to a single electric propulsion engine or a single group of electric propulsion engines, or each may be in electrical communication with a common electrical bus to provide power to the electric propulsion engine(s).

Moreover, it will be appreciated that although the propulsion system described herein is depicted as having been incorporated into an aircraft 10, in other embodiments, the propulsion system may additionally or alternatively be incorporated into other vehicles. For example, in other embodiments, the propulsion system may be incorporated into a nautical vehicle utilizing one or more turbine engines (such as a ship or submarine), a locomotive vehicle utilizing one or more turbine engines, automobiles, unmanned vehicles, etc. In addition, the inventive aspects of the present disclosure are not limited to hybrid-electric (or gas-electric) propulsion systems. Indeed, the inventive aspects of the present disclosure can be incorporated into fully-electric propulsion systems as well as applications other than propulsion systems.

(i) Boost Power Converter

Figure 4:
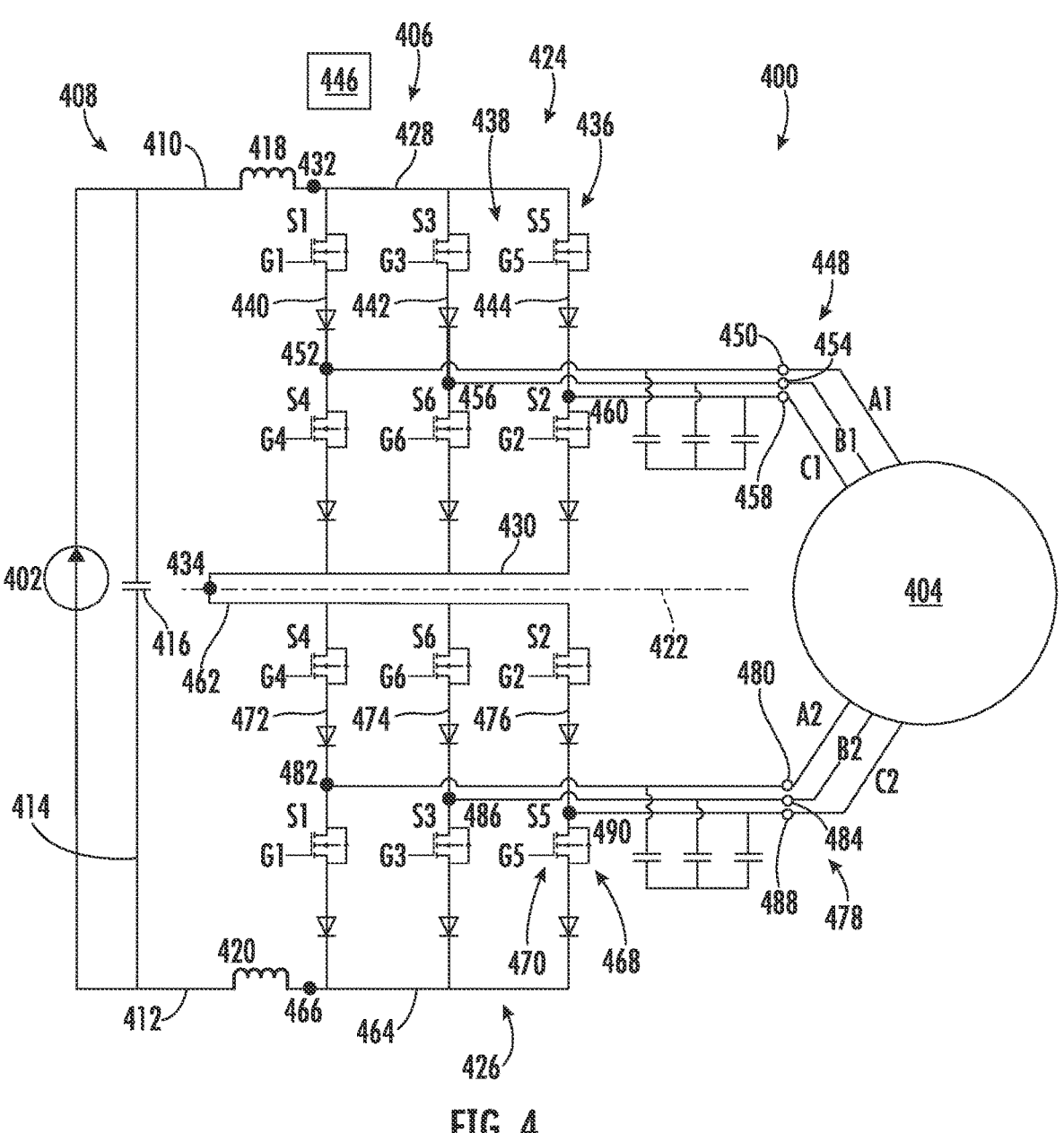
FIG. 4 provides a diagram of an electrical power system having a power converter according to an example embodiment of the present disclosure.

FIG. 4 provides a diagram of an electrical power system 400 according to an example embodiment of the present disclosure. As depicted, the electrical power system 400 includes a power source 402, a load 404, and a power converter 406 for controlling electrical power transmission between the power source 402 and the load 404. For this embodiment, the power source 402 is a DC current source, the power converter 406 is a multilevel DC/AC power converter operable to convert DC power to AC power, and the load 404 is a six-phase electric machine, such as an electric machine operable to drive a fan of a propulsion system. For instance, the electrical power system 400 of FIG. 4 can be incorporated into the propulsion system 50 of the aircraft 10 of FIG. 1.

As shown in FIG. 4, a power bus 408 electrically couples the power source 402 and the power converter 406. For this embodiment, the power bus 408 is a DC power bus. The power bus 408 includes a positive DC-link 410 and a negative DC-link 412. A DC-link 414 spans between the positive DC-link 410 and the negative DC-link 412. A DC-link capacitor 416 is positioned along the DC-link 414 and is operable to stabilize the DC voltage. A first inductor 418 is positioned along the positive DC-link 410 and a second inductor 420 is positioned along the negative DC-link 412. Notably, the first inductor 418 and the second inductor 420 are symmetrically arranged. That is, the position of the first inductor 418 "mirrors" the position of the second inductor 420 with respect to a centerline 422 defined by the power converter 406. The symmetric positioning of the first inductor 418 and the second inductor 420 can facilitate reduction or elimination of common mode EMI associated with the power converter 406.

The power converter 406 includes a first inverter 424 and a second inverter 426. For this embodiment, the first inverter 424 is electrically coupled with the second inverter 426 in series. Moreover, for this example embodiment, the first inverter 424 and the second inverter 426 are both current source inverters.

The first inverter 424 has an outer rail 428 and an inner rail 430. The outer rail 428 is electrically coupled with the positive DC-link 410 at a first node 432. The inner rail 430 of the first inverter 424 is electrically coupled with a rail of the second inverter 426 at a series connector node 434. In addition, the first inverter 424 has a plurality of first switches 436 driven by respective first gates 438. The first switches 436 include switches S1, S2, S3, S4, S5, S6, with switches S1 and S4 being positioned along a first leg 440, switches S3 and S6 being positioned along a second leg 442, and switches S5 and S2 being positioned along a third leg 444. Switches S1, S2, S3, S4, S5, S6 each have respective gates G1, G2, G3, G4, G5, G6 as shown in FIG. 4. The gates G1, G2, G3, G4, G5, G6 can be controlled by a controller 446 to drive their respective switches S1, S2, S3, S4, S5, S6 to high and low states in accordance with a reduced common mode voltage (CMV) pulse width modulated (PWM) switching scheme as will be described herein.

Each leg 440, 442, 444 spans between the outer rail 428 and the inner rail 430 of the first inverter 424. Moreover, each leg 440, 442, 444 is associated with a power phase, with the first leg 440 being associated with a phase A1, the second leg 442 being associated with a phase B1, and the third leg 444 being associated with a phase C1. Further, the first inverter 424 has a first multi-phase output 448. The first multi-phase output 448 is a three-phase output in this example embodiment. Particularly, an output terminal 450 electrically coupled with the first leg 440 between switch S1 and S4 at a first leg node 452 outputs phase A1 power, an output terminal 454 electrically coupled with the second leg 442 between switch S3 and S6 at a second leg node 456 outputs phase B1 power, and an output terminal 458 electrically coupled with the third leg 444 between switch S5 and S2 at a third leg node 460 outputs phase C1 power to the load 404.

Referring still to FIG. 4, the second inverter 426 has an inner rail 462 and an outer rail 464. The inner rail 462 of the second inverter 426 is electrically coupled with the inner rail 430 of the first inverter 424 at the series connector node 434. The outer rail 464 of the second inverter 426 is electrically coupled with the negative DC-link 412 at a second node 466. Further, the second inverter 426 has a plurality of second switches 468 driven by respective second gates 470. The second switches 468 include switches S1, S2, S3, S4, S5, S6, with switches S1 and S4 being positioned along a first leg 472, switches S3 and S6 being positioned along a second leg 474, and switches S5 and S2 being positioned along a third leg 476 of the second inverter 426. Switches S1, S2, S3, S4, S5, S6 of the second inverter 426 each have respective gates G1, G2, G3, G4, G5, G6 as illustrated in FIG. 4. The gates G1, G2, G3, G4, G5, G6 of the second inverter 426 can be controlled by the controller 446 to drive their respective switches S1, S2, S3, S4, S5, S6 to high and low states in accordance with a reduced CMV PWM switching scheme as will be described herein. In some alternative embodiments, the gates G1, G2, G3, G4, G5, G6 of the second inverter 426 can be controlled by a controller dedicated to the second inverter 426 rather than a single controller 446 that controls both the first inverter 424 and the second inverter 426 as in the embodiment of FIG. 4.

Each leg 472, 474, 476 of the second inverter 426 spans between the inner rail 462 and the outer rail 464. Moreover, each leg 472, 474, 476 is associated with a power phase, with the first leg 472 being associated with a phase A2, the second leg 474 being associated with a phase B2, and the third leg 476 being associated with a phase C2. Further, the second inverter 426 has a second multi-phase output 478. The second multi-phase output 478 is a three-phase output in this example embodiment. Particularly, an output terminal 480 electrically coupled with the first leg 472 between switch S1 and S4 at a first leg node 482 outputs phase A2 power, an output terminal 484 electrically coupled with the second leg 474 between switch S3 and S6 at a second leg node 486 outputs phase B2 power, and an output terminal 488 electrically coupled with the third leg 476 between switch S5 and S2 at a third leg node 490 outputs phase C2 power to the load 404. As the load 404, which is an electric machine in this example embodiment, receives six-phase power, the electric machine is a six-phase electric machine.

Notably, the first inverter 424 and the second inverter 426 have symmetric topologies. That is, the first switches 436 of the first inverter 424 and the second switches 468 of the second inverter 426 are symmetrically arranged. Stated another way, the first switches 436 and the second switches 468 are arranged to "mirror" one another with respect to a centerline 422 defined by the power converter 406.

For instance, switch S1 of the first inverter 424 mirrors the position of switch S1 of the second inverter 426. Specifically, switch S1 of the first inverter 424 is positioned along the first leg 440 of the first inverter 424 between the outer rail 428 of the first inverter 424 with respect to the centerline 422 and the first leg node 452. Similarly, switch S1 of the second inverter 426 is positioned along the first leg 472 of the second inverter 426 between the outer rail 464 of the second inverter 426 with respect to the centerline 422 and the first leg node 482. Thus, switch S1 of the first inverter 424 mirrors the position of switch S1 of the second inverter 426.

Similarly, switch S4 of the first inverter 424 mirrors the position of switch S4 of the second inverter 426. As shown in FIG. 4, switch S4 of the first inverter 424 is positioned along the first leg 440 of the first inverter 424 between the inner rail 430 of the first inverter 424 and the first leg node 452. Similarly, switch S4 of the second inverter 426 is positioned along the first leg 472 of the second inverter 426 between the inner rail 462 of the second inverter 426 and the first leg node 482. Thus, switch S4 of the first inverter 424 mirrors the position of switch S4 of the second inverter 426. Based on the teachings with respect to switches S1 and S4 and their respective mirrored positioning in the first and second inverters 424, 426, it will be appreciated that switches S3 and S6 of the first inverter 424 respectively mirror switches S3 and S6 of the second inverter 426 and that switches S5 and S2 of the first inverter 424 respectively mirror switches S5 and S2 of the second inverter 426.

Figure 5:
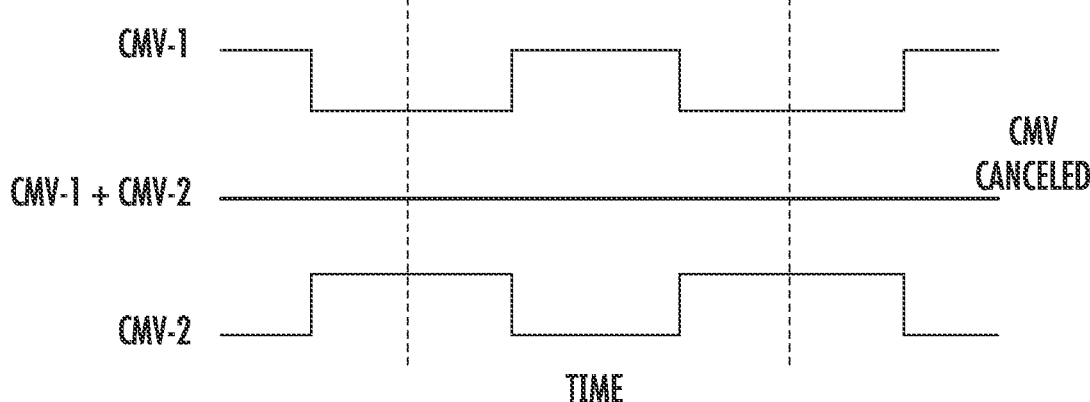
FIG. 5 graphically depicts resultant common mode voltage signals as functions of time, the resultant common mode voltage signals being generated as a result of execution of a pulse width modulated switching scheme by the power converter of FIG. 4.

One or more processors, e.g., of the controller 446, can cause the first and second gates 438, 470 to drive their respective first and second switches 436, 468 in a pulse width modulated (PWM) switching scheme. With reference to FIG. 4 and FIG. 5, the one or more processors of the controller 446 can cause the first gates 438 to drive their respective first switches 436 to generate a first pulse width modulated signal associated with phase A1, a second pulse width modulated signal associated with phase B1, and a third pulse width modulated signal associated with phase C1. The pulses of the pulse width modulated signals each have rising and falling edges, or switching transients, which may occur at different points in time. As depicted in FIG. 5, causing the first gates 438 to drive their respective first switches 436 in the PWM switching scheme generates a first common mode signal CMV-1, which is depicted as a common mode voltage signal in FIG. 5. The magnitude of the first common mode signal CMV-1 is an average of the pulse width modulated signals of each phase for a given point in time.

As further depicted in FIG. 5, the one or more processors of the controller 446 can cause the second gates 470 to drive their respective second switches 468 to generate a first pulse width modulated signal associated with phase A2, a second pulse width modulated signal associated with phase B2, and a third pulse width modulated signal associated with phase C2. The pulses of the pulse width modulated signals each have rising and falling edges, or switching transients, which may occur at different points in time. Causing the second gates 470 to drive their respective second switches 468 in the PWM switching scheme generates a second common mode signal CMV-2, which is depicted as a common mode voltage signal in FIG. 5. The magnitude of the second common mode signal CMV-2 is an average of the pulse width modulated signals of each phase for a given point in time. The pulse width modulated signals can be generated by a pulse generator of the controller 446, e.g., based on a demanded current or voltage associated with the load 404.

As will be appreciated by comparing the first common mode signal CMV-1 and the second common mode signal CMV-2, the first common mode signal CMV-1 and the second common mode signal CMV-2 are one hundred eighty degrees (180°) out of phase with one another. Stated another way, the first common mode signal CMV-1 generated by switching of the first switches 436 is inverted with respect to the second common mode signal CMV-2 generated by switching of the second switches 468. Consequently, as shown in FIG. 5, the first common mode signal CMV-1 and the second common mode signal CMV-2 cancel each other out as represented by a resultant signal CMV-1+CMV-2.

The symmetric topologies of the first inverter 424 and the second inverter 426, or rather the mirrored switch placement of the first and second inverters 424, 426, and implementation of a PWM switching scheme enables certain advantages, benefits, and technical effects, such as reducing or eliminating common mode voltage seen by external common mode circuit components associated with the power converter 406. Particularly, with the symmetric topologies and PWM switching scheme, the voltage and current of the first inverter 424 and the second inverter 426 are one hundred degrees (180°) out of phase with each other, which effectively cancels or reduces the common mode voltages generated at each switching transient. This may significantly reduce common mode electromagnetic interference measured on the DC side of the power converter 406. This may reduce the need or size of electromagnetic interference filters, which may reduce the weight, size, and packaging of a power converter 406. This benefit is particularly useful for aviation and other applications where compactness and weight are of particular importance. Moreover, the power density of the power converter 406 can be improved due to the reduced or eliminated need for electromagnetic interference filters. In addition, the disclosed power converter 406 may be better equipped to achieve high fault tolerance, and may be particularly useful for high-voltage and/or high-current, and/or high-power applications. The series-connected first and second inverters 424, 426 are particularly suitable for high-voltage/high-current/high-power applications. Further, the symmetric placement of the first and second inductors 418, 420 can further facilitate reduction or elimination of common mode emissions, such as common mode voltage emissions.

Figure 6:
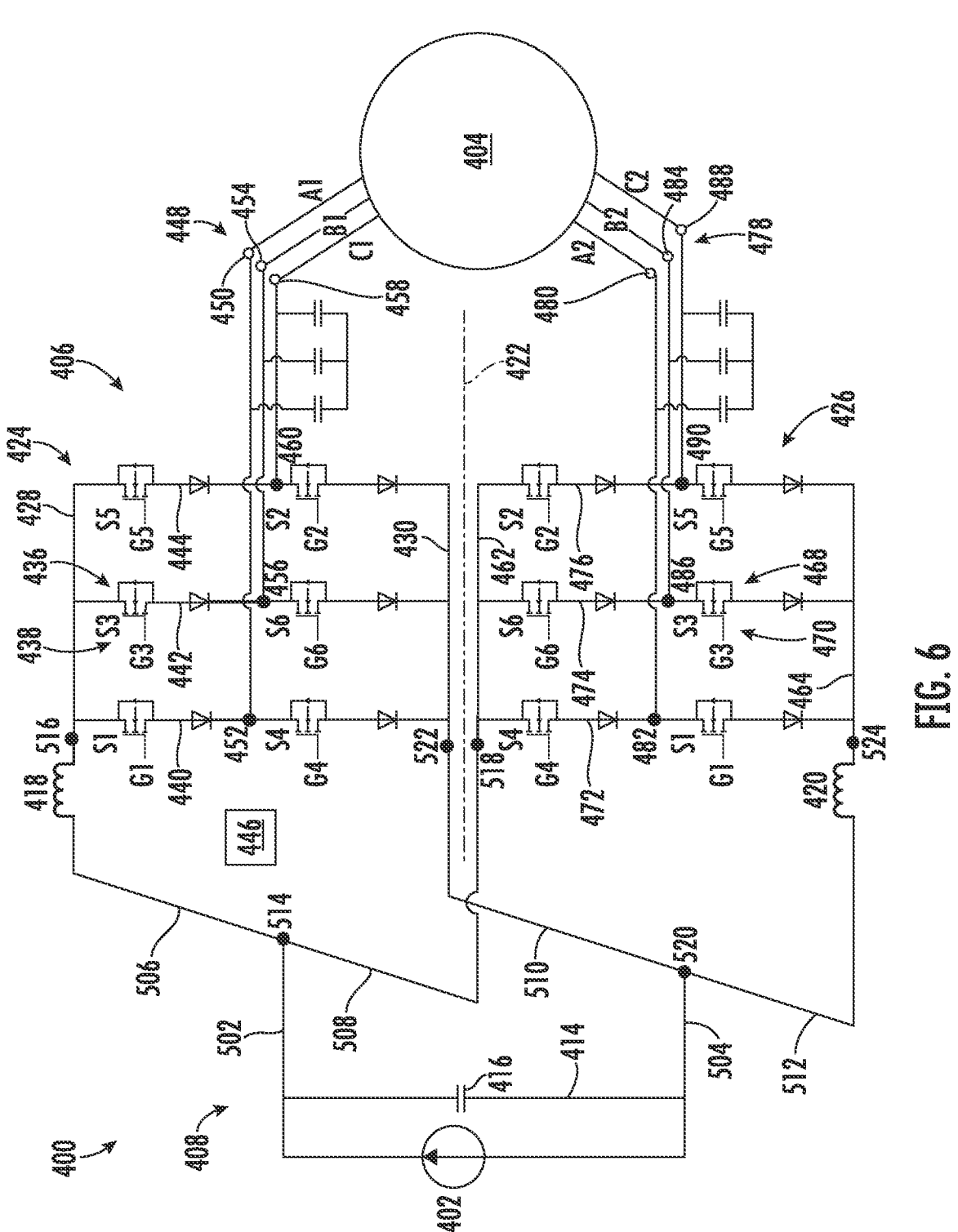
FIG. 6 provides a diagram of an electrical power system having a power converter according to another example embodiment of the present disclosure.

FIG. 6 provides a diagram of an electrical power system 400 according to another example embodiment of the present disclosure. The electrical power system 400 of FIG. 6 is arranged in a similar manner as the electrical power system of FIG. 4 except as provided below. Like or similar parts have retained their designations in FIG. 6 and the accompanying description.

For the depicted embodiment of FIG. 6, the first inverter 424 and the second inverter 426 of the power converter 406 are parallel-connected inverters (whereas the first inverter 424 and the second inverter 426 of the power converter 406 shown in FIG. 4 are series-connected inverters). As illustrated in FIG. 6, for this embodiment, the power bus 408 includes a positive external DC-link 502 and a negative external DC-link 504. The DC-link 414 along which the DC-link capacitor 416 is positioned spans between and electrically connects the positive external DC-link 502 and the negative external DC-link 504.

The power bus 408 includes a first positive DC-link 506, a second positive DC-link 508, a first negative DC-link 510, and a second negative DC-link 512. The first positive DC-link 506 and the second positive DC-link 508 are electrically connected to the positive external DC-link 502 at a positive DC-link node 514. The first positive DC-link 506 electrically connects the positive external DC-link 502 with the outer rail 428 of the first inverter 424 at a first positive node 516. The second positive DC-link 508 electrically connects the positive external DC-link 502 with the inner rail 462 of the second inverter 426 at a second positive node 518.

The first negative DC-link 510 and the second negative DC-link 512 are electrically connected to the negative external DC-link 504 at a negative DC-link node 520. The first negative DC-link 510 electrically connects the negative external DC-link 504 with the inner rail 430 of the first inverter 424 at a first negative node 522. The second negative DC-link 512 electrically connects the negative external DC-link 504 with the outer rail 464 of the second inverter 426 at a second negative node 524.

For the depicted embodiment of FIG. 6, the first inductor 418 is positioned along the first positive DC-link 506 and the second inductor 420 is positioned along the second negative DC-link 512. In this regard, as shown, the first inductor 418 and the second inductor 420 are arranged symmetrically with one another along the power bus 408 with respect to the centerline 422. The symmetric placement of the first and second inductors 418, 420 can facilitate reduction or elimination of common mode EMI.

Further, advantageously, as the first inverter 424 and the second inverter 426 of the power converter 406 are parallel-connected inverters in the embodiment of FIG. 6, the voltage on the power bus 408 can be half the voltage of what would be needed for series-connected inverters for a given demanded power output of the power converter 406. For example, for the parallel-connected inverters of FIG. 6 to both output 400 volts, the voltage on the power bus 408 can be 400 volts. However, if the inverters were series-connected inverters (such as in the embodiment of FIG. 4), the voltage on the power bus 408 can be 800 volts so that both inverters 424, 426 can output 400 volts. Accordingly, for embodiments having parallel-connected inverters, less insulation on the power bus 408 may be needed and a wider variety of power supplies may be available for use. Moreover, the first and second inductors 418, 420 in FIG. 6 would be subjected to half the electric current compared to the first and second inductors 418, 420 in FIG. 4.

Figure 7:
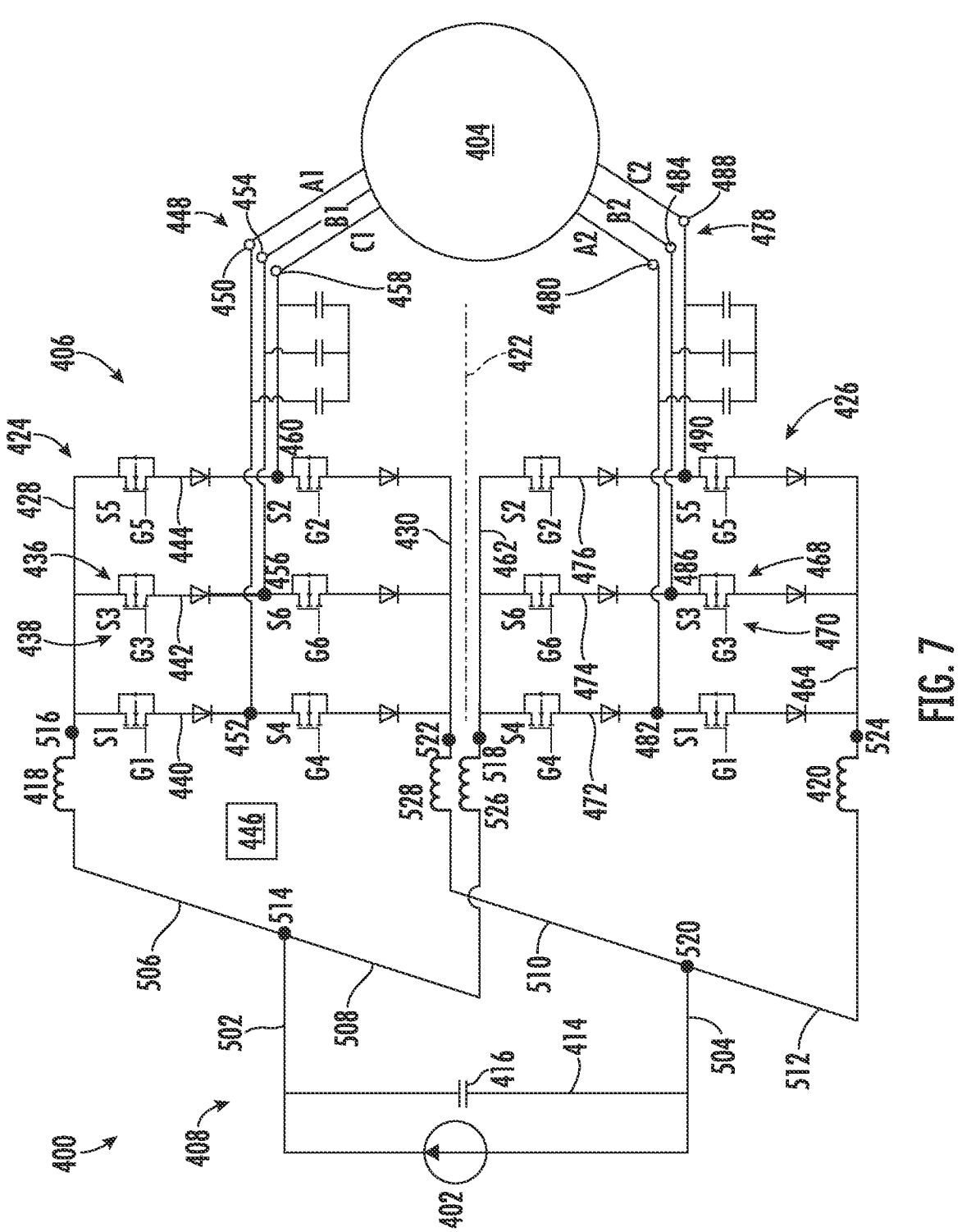
FIG. 7 provides a diagram of an electrical power system having a power converter according to yet another example embodiment of the present disclosure.

FIG. 7 provides a diagram of an electrical power system 400 according to yet another example embodiment of the present disclosure. The electrical power system 400 of FIG. 7 is arranged in a similar manner as the electrical power system of FIG. 6 except as provided below. Like or similar parts have retained their designations in FIG. 7 and the accompanying description.

For the depicted embodiment of FIG. 7, the electrical power system 400 includes a third inductor 526 and a fourth inductor 528 in addition to the first inductor 418 and the second inductor 420. For the depicted embodiment of FIG. 7, the first inductor 418 is positioned along the first positive DC-link 506 and the second inductor 420 is positioned along second negative DC-link 512. Thus, the first inductor 418 and the second inductor 420 are arranged symmetrically with one another along the power bus 408 with respect to the centerline 422. Further, the third inductor 526 is positioned along the second positive DC-link 508 and the fourth inductor 528 is positioned along first negative DC-link 510. Thus, the third inductor 526 and the fourth inductor 528 are arranged symmetrically with one another along the power bus 408 with respect to the centerline 422.

The topology of the power converter 406 of FIG. 7 includes the benefit of the third and fourth inductors 526, 528 to smooth the flow of electric current to the second inverter 426 via the third inductor 526 and to smooth the flow from the first inverter 424 via the fourth inductor 528, which may further reduce EMI associated with the power converter 406 and the overall electrical power system 400. Further, advantageously, if one of the inverters 424, 426 of FIG. 7 is shut down or otherwise stops operating, common mode EMI can still be reduced by the inductors associated with the operating inverter. For instance, if the first inverter 424 is shut down or otherwise stops operating, the second and third inductors 420, 526 can still cancel common mode EMI associated with the second inverter 426. Similarly, if the second inverter 426 is shut down or otherwise stops operating, the first and fourth inductors 418, 528 can still cancel or reduce common mode EMI associated with the first inverter 424.

Figure 8:
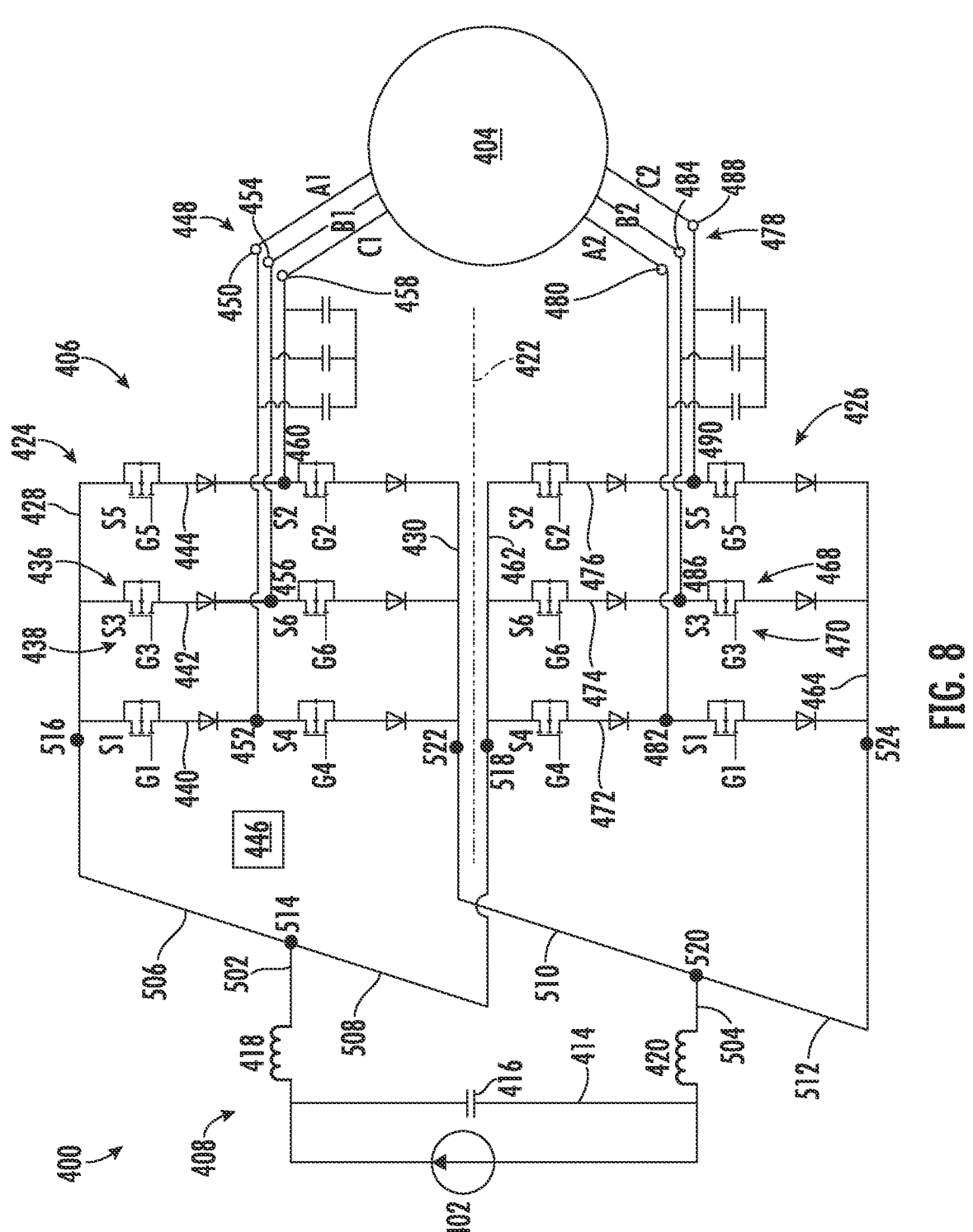
FIG. 8 provides a diagram of an electrical power system having a power converter according to a further example embodiment of the present disclosure.

FIG. 8 provides a diagram of an electrical power system 400 according to a further example embodiment of the present disclosure. The electrical power system 400 of FIG. 8 is arranged in a similar manner as the electrical power system of FIG. 6 except as provided below. Like or similar parts have retained their designations in FIG. 8 and the accompanying description.

For the depicted embodiment of FIG. 8, the first inductor 418 is positioned along the positive external DC-link 502 (as opposed to being positioned along the first positive DC-link 506 as in FIG. 6). Further, in the embodiment of FIG. 8, the second inductor 420 is positioned along the negative external DC-link 504 (as opposed to being positioned along the second negative DC-link 512 as in FIG. 6). Notably, as in the embodiments of FIGS. 4, 6, and 7, the first inductor 418 and the second inductor 420 are arranged symmetrically with one another along the power bus 408 with respect to the centerline 422.

The topology of the power converter 406 of FIG. 8 includes the benefit of the first and second inductors 418, 420 being positioned on the external DC-links, which allows the flow of electric current to the positive rails of the first and second inverters 424, 426 to be smoothed by a single inductor (i.e., the first inductor 418) and allows the flow of electric current from the negative rails of the first and second inverters 424, 426 to be smoothed by a single inductor (i.e., the second inductor 420) before being provided to the power source 402. Advantageously, if one of the first and second inverters 424, 426 of FIG. 8 is shut down or otherwise stops operating, common mode EMI can still be reduced by the first and second inductors 418, 420 due to their respective placement on the external DC-links 502, 504.

(ii) Buck-Boost Power Converter

Figure 9:
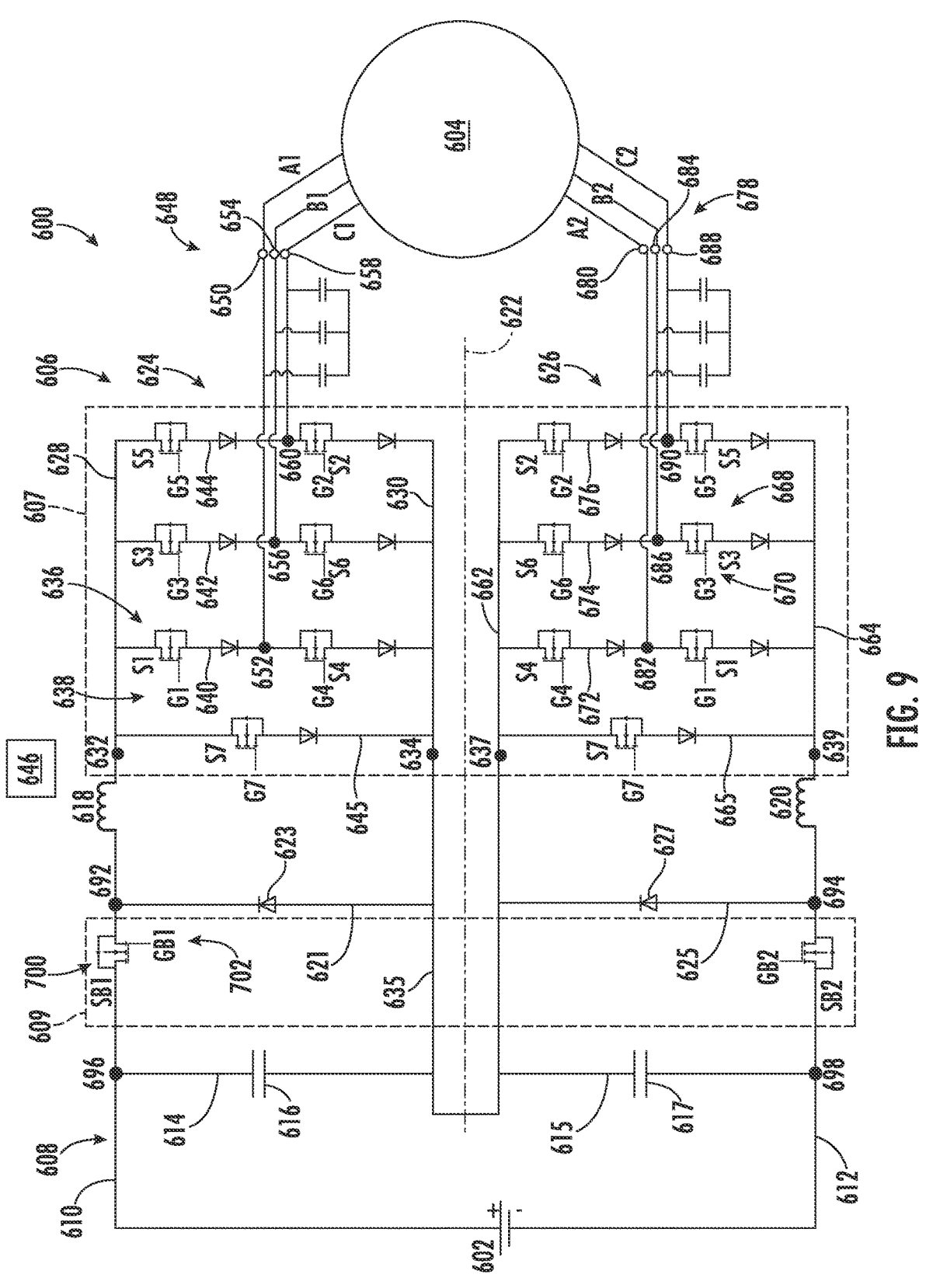
FIG. 9 provides a diagram of an electrical power system having a buck-boost power converter according to an example embodiment of the present disclosure.

FIG. 9 provides a diagram of an electrical power system 600 according to an example embodiment of the present disclosure. As depicted, the electrical power system 600 includes a power source 602, a load 604, and a power converter 606 for controlling electrical power transmission between the power source 602 and the load 604. For this embodiment, the power source 602 is a DC voltage source, the power converter 606 is a current-link buck-boost power converter operable to convert DC power to AC power, and the load 604 is a six-phase electric machine, such as an electric machine operable to drive a fan of a propulsion system. For instance, the electrical power system 600 of FIG. 9 can be incorporated into the propulsion system 50 of the aircraft 10 of FIG. 1.

As shown in FIG. 9, a power bus 608 electrically couples the power source 602 and the power converter 606. For this embodiment, the power bus 608 is a direct current power bus (or DC power bus). The power bus 608 includes a positive DC-link 610 and a negative DC-link 612. The positive DC-link 610 is electrically connected to a positive terminal of the power source 602, and the negative DC-link 612 is electrically connected to a negative terminal of the power source 602.

A first DC-link 614 of the power converter 606 spans between the positive DC-link 610 and a connector link 635. A first DC-link capacitor 616 is positioned along the first DC-link 614 and is operable to stabilize the DC voltage across the positive DC-link 610 and the connector link 635. A second DC-link 615 of the power converter 606 spans between the negative DC-link 612 and the connector link 635. A second DC-link capacitor 617 is positioned along the second DC-link 615 and is operable to stabilize the DC voltage across the negative DC-link 612 and the connector link 635. A first diode link 621 of the power converter 606 spans between and connects the positive DC-link 610 and the connector link 635. A first diode 623 is positioned along the first diode link 621. A second diode link 625 of the power converter 606 spans between and connects the negative DC-link 612 and the connector link 635. A second diode 627 is positioned along the second diode link 625.

The power converter 606 includes a boost stage 607 and a buck stage 609. Generally, the buck stage 609 "bucks down" the voltage and the boost stage 607 "boosts up" the voltage. The boost stage 607 includes a first inverter 624 and a second inverter 626. For this embodiment, the first inverter 624 is electrically coupled with the second inverter 626 in series. Moreover, for this example embodiment, the first inverter 624 and the second inverter 626 are both current source inverters.

The first inverter 624 has an outer rail 628 and an inner rail 630. The outer rail 628 is electrically coupled with the positive DC-link 610 at a first node 632. The inner rail 630 of the first inverter 624 is electrically coupled with the connector link 635 at a first connector node 634. The connector link 635 electrically couples the first inverter 624 and the second inverter 626 in series.

In addition, the first inverter 624 has a plurality of first switches 636 driven by respective first gates 638. The first switches 636 include switches S1, S2, S3, S4, S5, S6, and optionally switch S7. Switches S1 and S4 are positioned along a first leg 640, switches S3 and S6 are positioned along a second leg 642, and switches S5 and S2 are positioned along a third leg 644. Switch S7 is positioned along a fourth leg 645. Switches S1, S2, S3, S4, S5, S6, S7 each have respective gates G1, G2, G3, G4, G5, G6, G7 as shown in FIG. 9. The gates G1, G2, G3, G4, G5, G6, G7 can be controlled by a controller 646 to drive their respective switches S1, S2, S3, S4, S5, S6, S7 to high and low states in accordance with a reduced common mode voltage (CMV) pulse width modulated (PWM) switching scheme as will be described below.

Each leg 640, 642, 644, 645 spans between the outer rail 628 and the inner rail 630 of the first inverter 624. Moreover, the first, second, and third legs 640, 642, 644 are each associated with a power phase, with the first leg 640 being associated with a phase A1, the second leg 642 being associated with a phase B1, and the third leg 644 being associated with a phase C1. Further, the first inverter 624 has a first multi-phase output 648. Particularly, an output terminal 650 electrically coupled with the first leg 640 between switch S1 and S4 at a first leg node 652 outputs phase A1 power, an output terminal 654 electrically coupled with the second leg 642 between switch S3 and S6 at a second leg node 656 outputs phase B1 power, and an output terminal 658 electrically coupled with the third leg 644 between switch S5 and S2 at a third leg node 660 outputs phase C1 power to the load 604.

Referring still to FIG. 9, the second inverter 626 has an inner rail 662 and an outer rail 664. The inner rail 662 of the second inverter 626 is electrically coupled with the inner rail 630 of the first inverter 624 via the connector link 635. The inner rail 662 of the second inverter 626 is electrically coupled with the connector link 635 at a second connector node 637. The outer rail 664 of the second inverter 626 is electrically coupled with the negative DC-link 612 at a second node 439.

Further, the second inverter 626 has a plurality of second switches 668 driven by respective second gates 670. The second switches 668 include switches S1, S2, S3, S4, S5, S6, and optionally switch S7. Switches S1 and S4 are positioned along a first leg 672, switches S3 and S6 are positioned along a second leg 674, and switches S5 and S2 are positioned along a third leg 676 of the second inverter 626. Switch S7 is positioned along a fourth leg 665. Switches S1, S2, S3, S4, S5, S6, S7 of the second inverter 626 each have respective gates G1, G2, G3, G4, G5, G6, G7 as illustrated in FIG. 9. The gates G1, G2, G3, G4, G5, G6, G7 of the second inverter 626 can be controlled by the controller 646 to drive their respective switches S1, S2, S3, S4, S5, S6, S7 to high and low states in accordance with a reduced CMV PWM switching scheme as will be described herein. In some alternative embodiments, the gates G1, G2, G3, G4, G5, G6, G7 of the second inverter 626 can be controlled by a controller dedicated to the second inverter 626 rather than a single controller 646 that controls both the first inverter 624 and the second inverter 626 as in the embodiment of FIG. 9.

Each leg 672, 674, 676, 665 of the second inverter 626 spans between the inner rail 662 and the outer rail 664. Moreover, the first, second, and third legs 672, 674, 676 are each associated with a power phase, with the first leg 672 being associated with a phase A2, the second leg 674 being associated with a phase B2, and the third leg 676 being associated with a phase C2. Further, the second inverter 626 has a second multi-phase output 678. Particularly, an output terminal 680 electrically coupled with the first leg 672 between switch S1 and S4 at a first leg node 682 outputs phase A2 power, an output terminal 684 electrically coupled with the second leg 674 between switch S3 and S6 at a second leg node 686 outputs phase B2 power, and an output terminal 688 electrically coupled with the third leg 676 between switch S5 and S2 at a third leg node 690 outputs phase C2 power to the load 604. As the load 604, which is an electric machine in this example embodiment, receives six-phase power, the electric machine is a six-phase electric machine.

Notably, the first inverter 624 and the second inverter 626 have symmetric topologies in this example embodiment shown in FIG. 9. That is, the first switches 636 of the first inverter 624 and the second switches 668 of the second inverter 626 are symmetrically arranged. Stated another way, the first switches 636 and the second switches 668 are arranged to "mirror" one another with respect to a centerline 622 defined by the power converter 606. In this regard, switch S1 of the first inverter 624 mirrors the position of switch S1 of the second inverter 626, switch S2 of the first inverter 624 mirrors the position of switch S2 of the second inverter 626, switch S3 of the first inverter 624 mirrors the position of switch S3 of the second inverter 626, switch S4 of the first inverter 624 mirrors the position of switch S4 of the second inverter 626, switch S5 of the first inverter 624 mirrors the position of switch S5 of the second inverter 626, switch S6 of the first inverter 624 mirrors the position of switch S6 of the second inverter 626, and switch S7 of the first inverter 624 mirrors the position of switch S7 of the second inverter 626.

As further shown in FIG. 9, a first inductor 618 is positioned along the positive DC-link 610 and a second inductor 620 is positioned along the negative DC-link 612. For this embodiment, the first inductor 618 is positioned along the positive DC-link 610 between the first inverter 624 and the buck stage 609, or more particularly, between the first node 632 and a first diode link node 692. The second inductor 620 is positioned along the negative DC-link 612 between the second inverter 626 and the buck stage 609, or more particularly, between the second node 639 and a second diode link node 694. Notably, for the depicted embodiment of FIG. 9, the first inductor 618 and the second inductor 620 are symmetrically arranged. That is, the position of the first inductor 618 "mirrors" the position of the second inductor 620 with respect to the centerline 622 defined by the power converter 606. The symmetric positioning of the first inductor 618 and the second inductor 620 can facilitate reduction or elimination of common mode EMI associated with the power converter 606. Moreover, although the power source 602 is a voltage source in the embodiment of FIG. 9, the positioning of the first and second inductors 618, 620 render the first and second inverters 624, 626 current source inverters.

The buck stage 609 of the power converter 606 includes buck switches 700 that are driven by respective buck gates 702. For instance, for the depicted embodiment of FIG. 9, the buck switches 700 include a first buck switch SB1 positioned along the positive DC-link 610 and a second buck switch SB2 positioned along the negative DC-link 612. Particularly, the first buck switch SB1 is positioned along the positive DC-link 610 between a first DC-link node 696 and the first diode link node 692. The second buck switch SB2 is positioned along the negative DC-link 612 between a second DC-link node 698 and the second diode link node 694. The first buck switch SB1 is driven by a first buck gate GB1 and the second buck switch SB2 is driven by a second buck gate G2.

Notably, the buck stage 609 of the power converter 606 has a symmetric topology. That is, the buck switches 700 are symmetrically arranged. Particularly, for the depicted embodiment of FIG. 9, the first buck switch SB1 and the second buck switch SB2 are symmetrically arranged. Stated another way, the first buck switch SB1 and the second buck switch SB2 are arranged to "mirror" one another with respect to the centerline 622 defined by the power converter 606.

The power converter 606 can be controlled in the following example manner. One or more processors, e.g., of the controller 646, can cause the gates of the power converter 606 to drive their respective switches in a PWM switching scheme. Particularly, the one or more processors of the controller 646 can cause the first and second gates 638, 670 of the boost stage 607 to drive their respective first and second switches 636, 668 and can cause the buck gates 702 of the buck stage 609 to drive their respective buck switches 700 in a PWM switching scheme.

Particularly, for the first inverter 624 of the boost stage 607, the one or more processors of the controller 646 can cause gates G1, G2, G3, G4, G5, G6 of the first gates 638 to drive their respective first switches S1, S2, S3, S4, S5, S6 to generate a first pulse width modulated signal associated with phase A1, a second pulse width modulated signal associated with phase B1, and a third pulse width modulated signal associated with phase C1. The one or more processors of the controller 646 can also cause gate G7 to drive switch S7 of the first inverter 624 to generate a pulse width modulated signal. Causing the first gates 638 to drive their respective first switches 636 in accordance with the PWM switching scheme generates a first common mode signal, which can be a common mode voltage signal. The magnitude of the first common mode signal is an average of the pulse width modulated signals generated by the first switches 636 of the boost stage 607 for a given point in time.

In a similar manner, for the second inverter 626 of the boost stage 607, the one or more processors of the controller 646 can cause gates G1, G2, G3, G4, G5, G6 of the second gates 670 to drive their respective first switches S1, S2, S3, S4, S5, S6 to generate a first pulse width modulated signal associated with phase A2, a second pulse width modulated signal associated with phase B2, and a third pulse width modulated signal associated with phase C2. The one or more processors of the controller 646 can also cause gate G7 to drive switch S7 of the second inverter 626 to generate a pulse width modulated signal. Causing the second gates 670 to drive their respective second switches 668 in accordance with the PWM switching scheme generates a second common mode signal, which can be a common mode voltage signal. The magnitude of the second common mode signal is an average of the pulse width modulated signals generated by the second switches 668 of the boost stage 607 for a given point in time. The pulse width modulated signals generated by the first and second switches 636, 668 of the boost stage 607 can be generated by a pulse generator of the controller 446, e.g., based on a demanded current or voltage associated with the load 604.

The first common mode signal and the second common mode signal are generated by the first inverter 624 and the second inverter 626 of the boost stage 607 so as to be one hundred eighty degrees (180°) out of phase with one another. Stated another way, the first common mode signal generated by switching of the first switches 636 is inverted with respect to the second common mode signal generated by switching of the second switches 668. Consequently, the first common mode signal and the second common mode signal cancel each other out (similar to the cancelation shown in FIG. 5).

For the buck stage 609, the one or more processors of the controller 646 can cause the first buck gate GB1 to drive the first buck switch SB1 to generate a first buck pulse width modulated signal and can cause the second buck gate GB2 to drive the second buck switch SB2 to generate a second buck pulse width modulated signal. In this example, with reference to FIGS. 9 and 10, the first buck pulse width modulated signal also corresponds to a first buck common mode signal CMV-1-B as the magnitude of the first buck common mode signal CMV-1-B is an average of the pulse width modulated signal for a given point in time. Similarly, the second buck pulse width modulated signal corresponds to a second buck common mode signal CMV-2-B as the magnitude of the second buck common mode signal CMV-2-B is an average of the pulse width modulated signal for a given point in time.

Figure 10:
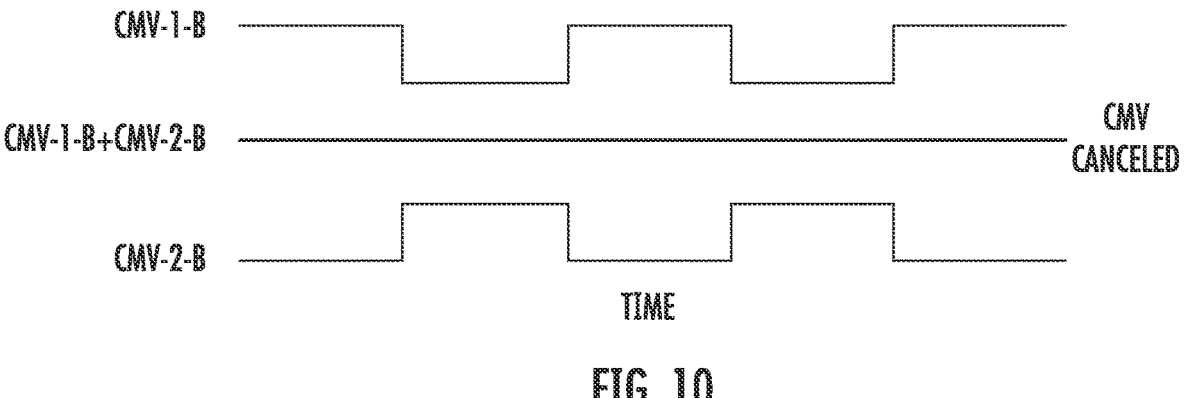
FIG. 10 graphically depicts resultant common mode voltage signals as functions of time, the resultant common mode voltage signals being generated as a result of execution of a pulse width modulated switching scheme by a buck stage of the power converter of FIG. 9.

Notably, in accordance with the PWM switching scheme, the first buck common mode signal CMV-1-B generated by switching the first buck switch SB1 and the second buck common mode signal CMV-2-B generated by switching the second buck switch SB2 are one hundred eighty degrees (180°) out of phase with one another. Stated another way, the first buck common mode signal CMV-1-B is inverted with respect to the second buck common mode signal CMV-2-B. Consequently, as shown in FIG. 10, the first buck common mode signal CMV-1-B and the second buck common mode signal CMV-2-B cancel each other out as represented by a resultant common mode buck signal CMV-1-B+CMV-2-B.

The symmetric topology of the boost stage 607 and the buck stage 609, or rather the mirrored switch placement of the first and second inverters 624, 626, the mirrored switch placement of the buck switches 700, and implementation of the disclosed PWM switching scheme, enables certain advantages, benefits, and technical effects. For instance, common mode voltage seen by external common mode circuit components associated with the power converter 606 may be reduced or eliminated. Particularly, with the symmetric topologies and the disclosed PWM switching scheme, the voltage and current of the first inverter 624 and the second inverter 626 of the boost stage 607 are one hundred degrees (180°) out of phase with each other, which effectively cancels or reduces the common mode voltages generated at each switching transient in the boost stage 607, and further, the voltage and current at the first buck switch SB1 and the second buck switch SB2 are one hundred degrees (180°) out of phase with each other, which effectively cancels or reduces the common mode voltages generated at each switching transient in the buck stage 609.

Accordingly, with common mode electromagnetic interference reductions at both the boost stage 607 and the buck stage 609 of the power converter 606, the electrical power system 600 may have lower common mode electromagnetic interference, which may reduce the need or size of electromagnetic interference filters associated with the power converter 606, which may reduce the weight, size, and packaging of a power converter 606. This benefit is particularly useful for aviation and other applications in which compactness and weight are of particular importance. Moreover, the power density of the power converter 606 can be improved due to the reduced or eliminated need for electromagnetic interference filters. In addition, the disclosed power converter 606 may be better equipped to achieve high fault tolerance, and may be particularly useful for high-voltage and/or high-current, and/or high-power applications. As noted previously, the symmetric positioning of the first inductor 618 and the second inductor 620 can facilitate reduction or elimination of common mode EMI associated with the power converter 606.

Figure 11:
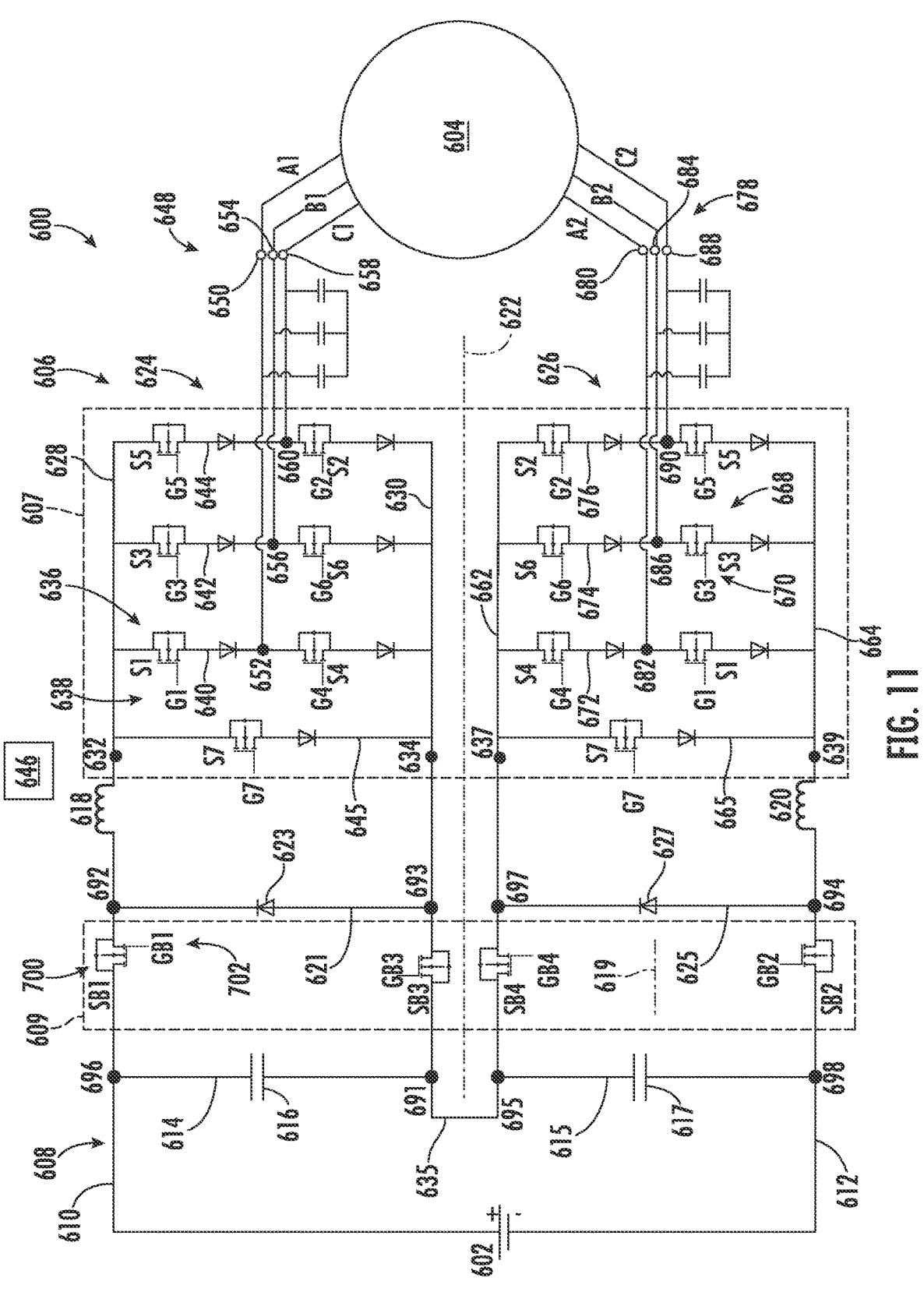
FIGS. 11 through 17 provide various diagrams of electrical power systems each having a buck-boost power converter according to example embodiments of the present disclosure.

FIG. 11 provides a diagram of an electrical power system 600 according to another example embodiment of the present disclosure. The electrical power system 600 of FIG. 11 is arranged in a similar manner as the electrical power system of FIG. 9 except as provided below. Like or similar parts have retained their designations in FIG. 11 and the accompanying description.

For the depicted embodiment of FIG. 11, the buck switches 700 of the buck stage 609 include a third buck switch SB3 and a fourth buck switch SB4 in addition to the first buck switch SB1 and the second buck switch SB2. The third buck switch SB3 is driven by a third buck gate GB3 and the fourth buck gate GB4 is driven by a fourth buck gate GB4. The third buck switch SB3 is positioned along the connector link 635 between a third DC-link node 691 and a third diode link node 693. The fourth buck switch SB4 is positioned along the connector link 635 between a fourth DC-link node 695 and a fourth diode link node 697.

The buck stage 609 of the power converter 606 of FIG. 11 has a symmetric topology. That is, the buck switches 700 are symmetrically arranged. Particularly, for the depicted embodiment of FIG. 11, the first buck switch SB1 and the second buck switch SB2 are symmetrically arranged and the third buck switch SB3 and the fourth buck switch SB4 are symmetrically arranged. Stated another way, the first buck switch SB1 and the second buck switch SB2 are arranged to "mirror" one another with respect to the centerline 622 defined by the power converter 606 and the third buck switch SB3 and the fourth buck switch SB4 are arranged to "mirror" one another with respect to the centerline 622.

The power converter 606 of FIG. 11 can be controlled in the following example manner. One or more processors, e.g., of the controller 646, can cause the gates of the power converter 606 to drive their respective switches in a PWM switching scheme. Particularly, the one or more processors of the controller 646 can cause the first and second gates 638, 670 of the boost stage 607 to drive their respective first and second switches 636, 668 and can cause the buck gates 702 of the buck stage 609 to drive their respective buck switches 700 in a PWM switching scheme.

First and second PWM signals generated by the first and second switches 636, 668 in accordance with the PWM switching scheme in the boost stage 607 can be generated to generate or render a first common mode signal and a second common mode signal, respectively. The first common mode signal and the second common mode signal are generated so that the first common mode signal and the second common mode signal are one hundred eighty degrees (180°) out of phase with one another, and as a result, cancel each other out as represented by a resultant signal.

PWM signals can be generated by the buck switches 700 in accordance with the PWM switching scheme in the buck stage 609. Particularly, the one or more processors of the controller 646 can cause the buck gates GB1, GB2, GB3, GB4 to drive their respective buck switches SB1, SB2, SB3, SB4 to generate, respectively, a first buck pulse width modulated signal, a second buck pulse width modulated signal, a third buck pulse width modulated signal, and a fourth buck pulse width modulated signal.

Causing the first and third buck gates GB1, GB3 to drive their respective buck switches SB1, SB3 in the PWM switching scheme generates a first buck common mode signal, which can be a common mode voltage signal. The magnitude of the first buck common mode signal is an average of the pulse width modulated signals generated by the first and third switches SB1, SB3 for a given point in time. Similarly, causing the second and fourth buck gates GB2, GB4 to drive their respective buck switches SB2, SB4 in the PWM switching scheme generates a second buck common mode signal, which can be a common mode voltage signal. The magnitude of the second buck common mode signal is an average of the pulse width modulated signals generated by the second and fourth switches SB2, SB4 for a given point in time.

In accordance with the PWM switching scheme, the first buck pulse width modulated signal and the second buck pulse width modulated signal generated by the symmetrically arranged first and second buck switches SB1, SB2 are one hundred eighty degrees (180°) out of phase with one another. Stated another way, the first buck pulse width modulated signal is inverted with respect to the second buck pulse width modulated signal. Likewise, the third buck pulse width modulated signal and the fourth buck pulse width modulated signal generated by the symmetrically arranged third and fourth buck switches SB3, SB4 are one hundred eighty degrees (180°) out of phase with one another. Stated another way, the third buck pulse width modulated signal is inverted with respect to the fourth buck pulse width modulated signal. Thus, the first buck common mode signal and the second buck common mode signal cancel each other out. Cancelation of common mode voltage in the buck stage 609 and the boost stage 607 has advantages, benefits, and technical effects as noted previously. Moreover, the addition of the third and fourth buck switches SB3, SB4 (compared to the embodiment of FIG. 9) may provide enhanced switching control in the buck stage 609, which may provide increased control in reduces or eliminating common mode EMI.

Figure 12:
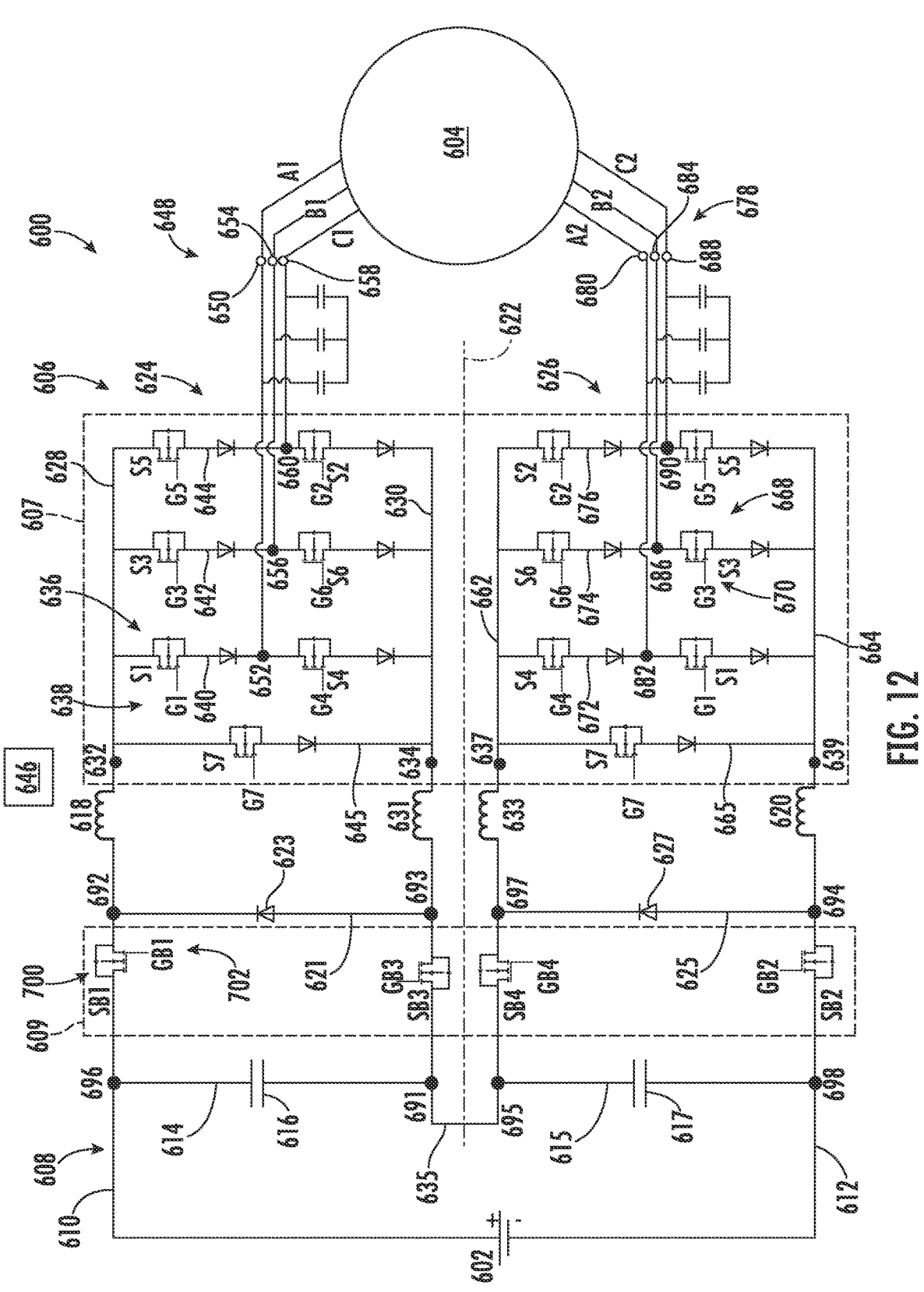

FIG. 12 provides a diagram of an electrical power system 600 according to yet another example embodiment of the present disclosure. The electrical power system 600 of FIG. 12 is arranged in a similar manner as the electrical power system of FIG. 11 except as provided below. Like or similar parts have retained their designations in FIG. 12 and the accompanying description.

For the depicted embodiment of FIG. 12, the power converter 606 includes a third inductor 631 and a fourth inductor 633 in addition to the first inductor 618 and the second inductor 620. For the depicted embodiment of FIG. 12, the first inductor 618 is positioned along the positive DC-link 610 and the second inductor 620 is positioned along the negative DC-link 612. The first inductor 618 and the second inductor 620 are arranged symmetrically with one another with respect to the centerline 622. Further, the third inductor 631 is positioned along the connector link 635 between the first connector node 634 and the third diode link node 693. The fourth inductor 633 is positioned along the connector link 635 between the second connector node 637 and the fourth diode link node 697. Thus, the third inductor 631 and the fourth inductor 633 are arranged symmetrically with one another with respect to the centerline 622. The first and second inductors 618, 620 form a first symmetric inductor pair, and the third and fourth inductors 631, 633 form a second symmetric inductor pair.

It will be appreciated that the first and second switches 636, 668 of the boost stage 607 and the buck switches 700 of the buck stage 609 of the power converter 606 of FIG. 12 can be switched according to a PWM switching scheme to cancel common mode emissions in the boost stage 607 and buck stage 609.

Further, notably, the topology of the power converter 606 of FIG. 12 may provide for common mode EMI cancelation or reduction in the buck stage 609 even when the first inverter 624 or the second inverter 626 of the boost stage 607 is shut off, e.g., due to a detected fault associated with one of the inverters 624, 626. As one example, the first inverter 624 can be shut off, e.g., due to a detected fault. In such a situation, buck switch SB1 would no longer be available to cancel common mode emissions associated with buck switch SB2, and buck switch SB3 would no longer be available to cancel common mode emissions associated with buck switch SB4. However, as shown in FIG. 12, buck switch SB2 and SB4 are arranged symmetrically with respect to an inverter centerline 619, which in this example is a centerline associated with the second inverter 626.

Thus, in response to the first inverter 624 being shut off, the one or more processors of the controller 646 can adjust the PWM switching scheme to render an adjusted PWM switching scheme. Accordingly, the one or more processors can cause the second buck switch SB2 and the fourth buck switch SB4 to switch according to the adjusted PWM switching scheme so that the second buck switch SB2 is pulse width modulated to generate a first adjusted buck common mode signal and so that the fourth buck switch SB4 is pulse width modulated to generate a second adjusted buck common mode signal that is one hundred eighty degrees (180°) out of phase with the first adjusted buck common mode signal. In this regard, buck switch SB2 and buck switch SB4 can be controlled to cancel out the common mode emissions in the buck stage 609, e.g., in a manner similar to the PWM switching scheme shown in FIG. 10. Thus, common mode EMI can still be canceled in the buck stage 609 even when the first inverter 624 is shut off. It will be appreciated that buck switches SB1 and SB3 can be used to cancel common mode EMI in the buck stage 609 as described above when the second inverter 626 is shut off.

In addition, the topology of the power converter 606 of FIG. 12 also includes the added benefit of the third and fourth inductors 631, 633 to smooth the flow of electric current prior to buck switch SB3 and after buck switch SB4, which may further reduce EMI associated with the power converter 606.

Figure 13:
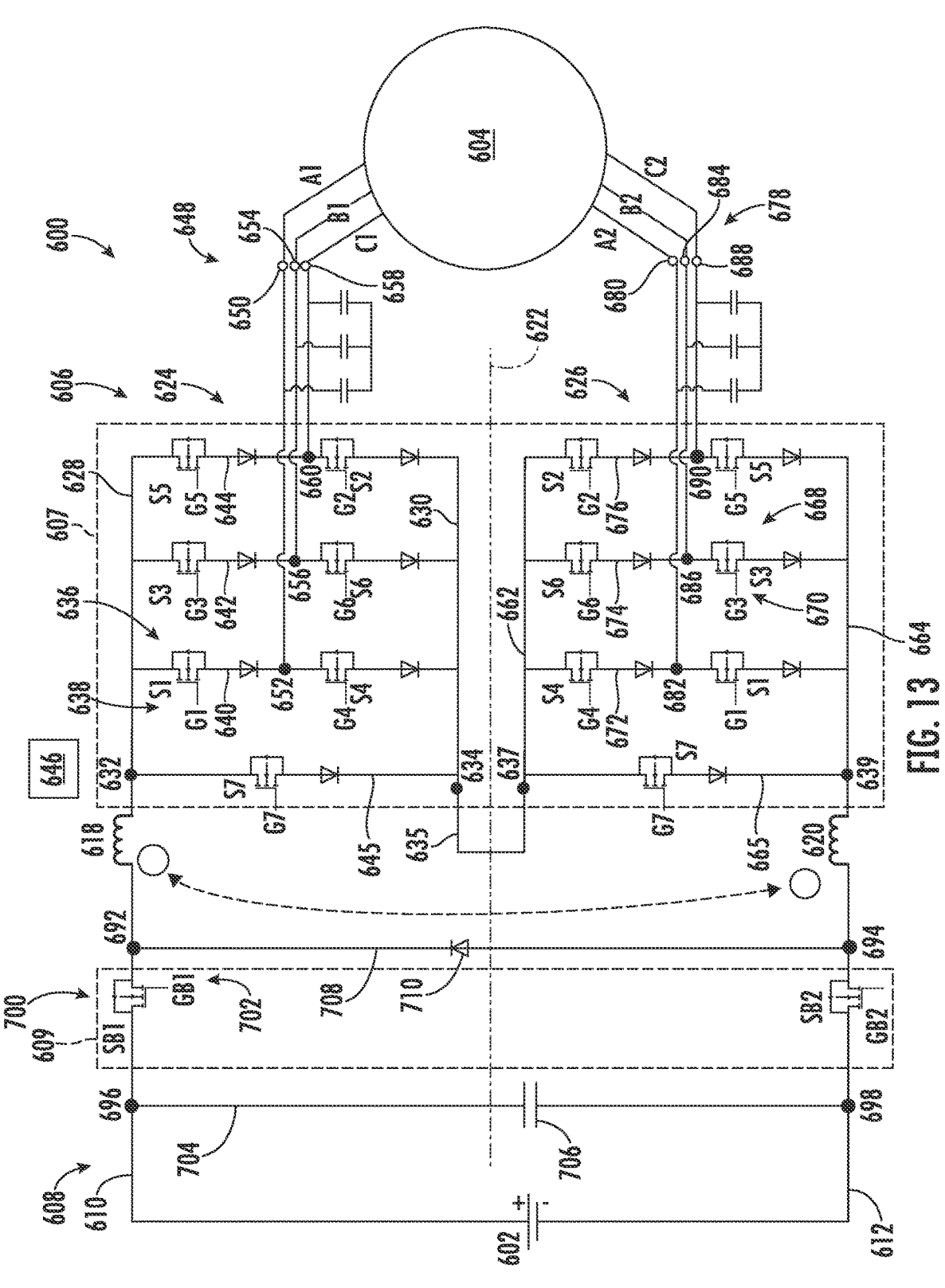

FIG. 13 provides a diagram of an electrical power system 600 according to yet another example embodiment of the present disclosure. The electrical power system 600 of FIG. 13 is arranged in a similar manner as the electrical power system of FIG. 9 except as provided below. Like or similar parts have retained their designations in FIG. 13 and the accompanying description.

For the depicted embodiment of FIG. 13, the connector link 635 electrically coupling the first inverter 624 and the second inverter 626 in series is arranged differently in FIG. 13 than in FIG. 9. As shown in FIG. 13, for this embodiment, there are no DC-links between the first connector node 634 and the second connector node 637. Thus, the first connector node 634 and the second connector node 637 are electrically the same node in FIG. 13. Accordingly, the connector link 635 directly electrically connects the inner rail 630 of the first inverter 624 and the inner rail 662 of the second inverter 626.

As further shown in FIG. 13, the power converter 606 includes a capacitor DC-link 704 that spans between and connects the positive DC-link 610 and the negative DC-link 612. The capacitor DC-link 704 is electrically connected to the positive DC-link 610 at the first DC-link node 696 and is electrically connected to the negative DC-link 612 at the second DC-link node 698. The capacitor DC-link 704 is positioned between the power source 602 and the buck stage 609. A DC-link capacitor 706 is positioned along the capacitor DC-link 704 and is operable to stabilize the DC voltage across the positive DC-link 610 and the negative DC-link 612.

The power converter 606 also includes a diode DC-link 708 that spans between and connects the positive DC-link 610 and the negative DC-link 612. The diode DC-link 708 is electrically connected to the positive DC-link 610 at the first diode link node 692 and is electrically connected to the negative DC-link 612 at the second diode link node 694. The diode DC-link 708 is positioned between the buck stage 609 and the boost stage 607. A DC-link diode 710 is positioned along the diode DC-link 708.

It will be appreciated that the first and second switches 636, 668 of the boost stage 607 and the buck switches 700 of the buck stage 609 of the power converter 606 of FIG. 13 can be switched according to a PWM switching scheme to cancel common mode emissions in the boost stage 607 and buck stage 609. Moreover, the placement of the first inductor 618 and second inductor 620 in the embodiment of FIG. 13 may provide for enhanced balancing of the electric current through the first inductor 618 and second inductor 620. That is, the electric current through the first and second inductors 618, 620 can be equal due to their respective placements. Accordingly, in some embodiments, the first and second inductors 618, 620 can be a coupled inductor, or rather, the first and second inductors 618, 620 can be magnetically coupled. This may reduce the weight of the power converter 606. In FIG. 13, the first and second inductors 618, 620 are depicted as a coupled inductor by the dashed line having opposing arrows pointing at opposing poles.

Figure 14:
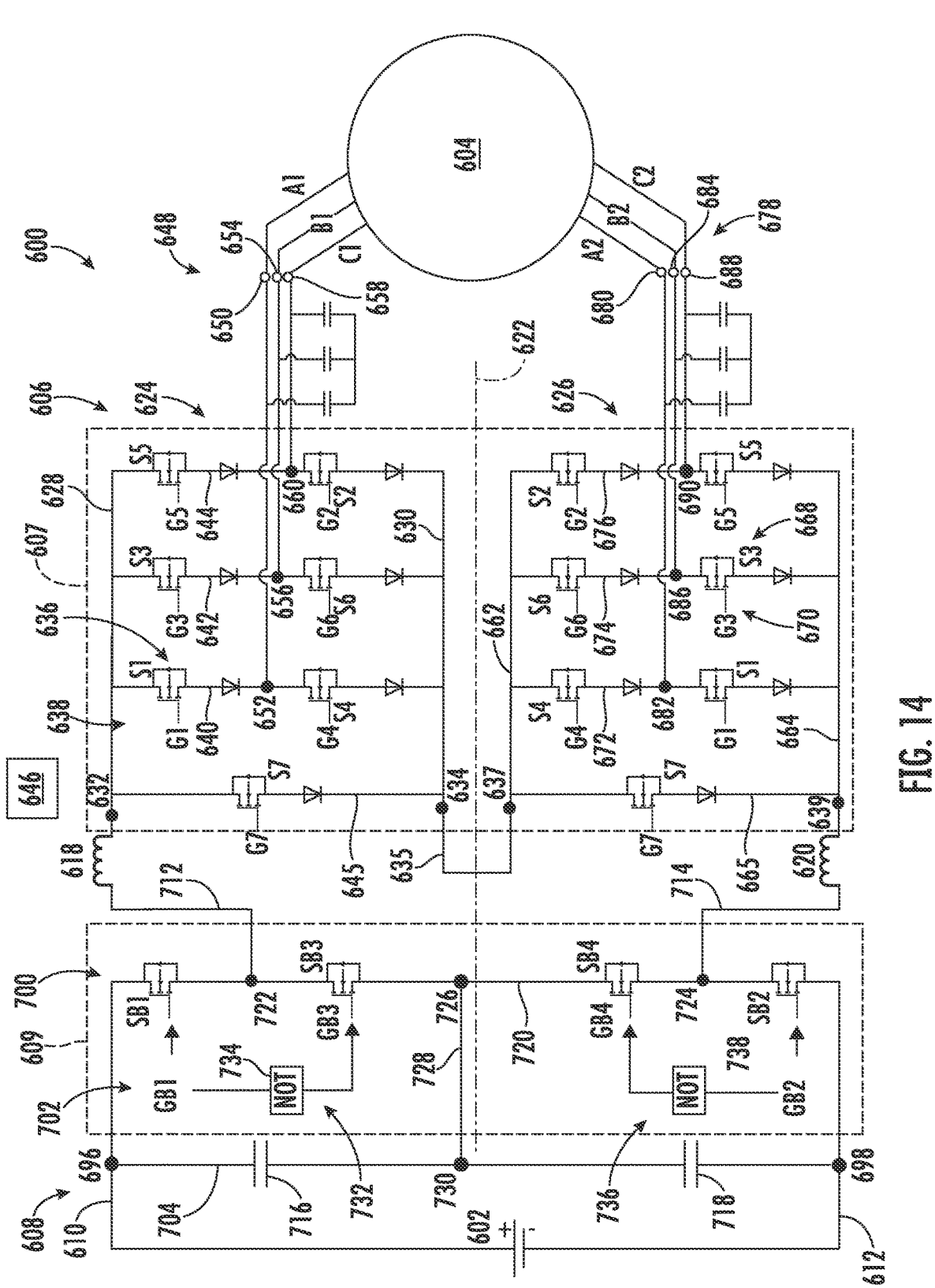

FIG. 14 provides a diagram of an electrical power system 600 according to a further example embodiment of the present disclosure. The electrical power system 600 of FIG. 14 is arranged in a similar manner as the electrical power system of FIG. 13 except as provided below. Like or similar parts have retained their designations in FIG. 14 and the accompanying description.

For the depicted embodiment of FIG. 14, the buck stage 609 is electrically connected in series with the first inverter 624 of the boost stage 607 via a first stage connector DC-link 712. Particularly, the first stage connector DC-link 712 electrically connects to the outer rail 628 of the first inverter 624 at the first node 632. The first stage connector DC-link 712 electrically connects to the buck stage 609, or rather a main buck link 720 of the buck stage 609, at a first main buck node 722. The buck stage 609 is electrically connected in series with the second inverter 626 of the boost stage 607 via a second stage connector DC-link 714. Specifically, the second stage connector DC-link 714 electrically connects to the outer rail 664 of the second inverter 626 at the second node 639. The second stage connector DC-link 714 electrically connects to the buck stage 609, or rather the main buck link 720 of the buck stage 609, at a second main buck node 724.

The first inductor 618 is positioned along the first stage connector DC-link 712 and the second inductor 620 is positioned along the second stage connector DC-link 714. The first inductor 618 and the second inductor 620 are symmetrically arranged. That is, the position of the first inductor 618 mirrors the position of the second inductor 620 with respect to the centerline 622 defined by the power converter 606.

A cross DC-link 728 electrically connects the main buck link 720 to the capacitor DC-link 704. The cross DC-link 728 electrically connects to the main buck link 720 at a mid-buck node 726 and to the capacitor DC-link 704 at a mid-capacitor DC-link node 730. A first DC-link capacitor 716 is positioned along the capacitor DC-link 704 between the first DC-link node 696 and the mid-capacitor DC-link node 730. A second DC-link capacitor 718 is positioned along the capacitor DC-link 704 between the second DC-link node 698 and the mid-capacitor DC-link node 730.

As further shown in FIG. 14, the buck switches 700 include buck switches SB1, SB2, SB3, and SB4. The buck switches SB1, SB2, SB3, and SB4 have respective buck gates GB1, GB2, GB3, and GB4. Buck switch SB1 is positioned along the main buck link 720 between the first DC-link node 696 and the first main buck node 722. Buck switch SB2 is positioned along the main buck link 720 between the second DC-link node 698 and the second main buck node 724. Buck switch SB3 is positioned along the main buck link 720 between the first main buck node 722 and the mid-buck node 726. Buck switch SB4 is positioned along the main buck link 720 between the second main buck node 724 and the mid-buck node 726. Thus, the first buck switch SB1 and the third buck switch SB3 are positioned on opposite sides of the first main buck node 722 with the third buck switch SB3 being positioned between the first main buck node 722 and the mid-buck node 726. The second buck switch SB2 and the fourth buck switch SB4 are positioned on opposite sides of the second main buck node 724 with the fourth buck switch SB4 being positioned between the second main buck node 724 and the mid-buck node 726. Accordingly, buck switches SB1 and SB2 are arranged symmetrically with one another with respect to the centerline 622. Similarly, buck switches SB3 and SB4 are arranged symmetrically with one another with respect to the centerline 622.

A first gate circuitry 732 including a first NOT gate 734 (or inverter) electrically couples buck gate GB1 and buck gate GB3 to provide a logic gate that ensures that if one buck switch of SB1 and SB3 is high or on, the other buck switch is low or off. In this regard, the first NOT gate 734 ensures that the first and third buck gates GB1, GB3 are complementary. A second gate circuitry 736 including a second NOT gate 738 (or inverter) electrically couples buck gate GB2 and buck gate GB4 to provide a logic gate that ensures that if one buck switch of SB2 and SB4 is high or on, the other buck switch is low or off. In this manner, the second NOT gate 738 ensures that the second and fourth buck gates GB2, GB4 are complementary.

It will be appreciated that the first and second switches 636, 668 of the boost stage 607 and the buck switches 700 of the buck stage 609 of the power converter 606 of FIG. 13 can be switched according to a PWM switching scheme to cancel common mode emissions in the boost stage 607 and buck stage 609. In addition, advantageously, the circuit topology and arrangement of the buck switches 700 in FIG. 14 is beneficial in that the buck switches 700 are subject to reduced voltage stress compared to other topologies. Further, the topology of the power converter 606 of FIG. 14 and the arrangement of the first and second inductors 618, 620 enables use of a coupled inductor, or rather so that the first and second inductors 618, 620 are magnetically coupled.

Figure 15:
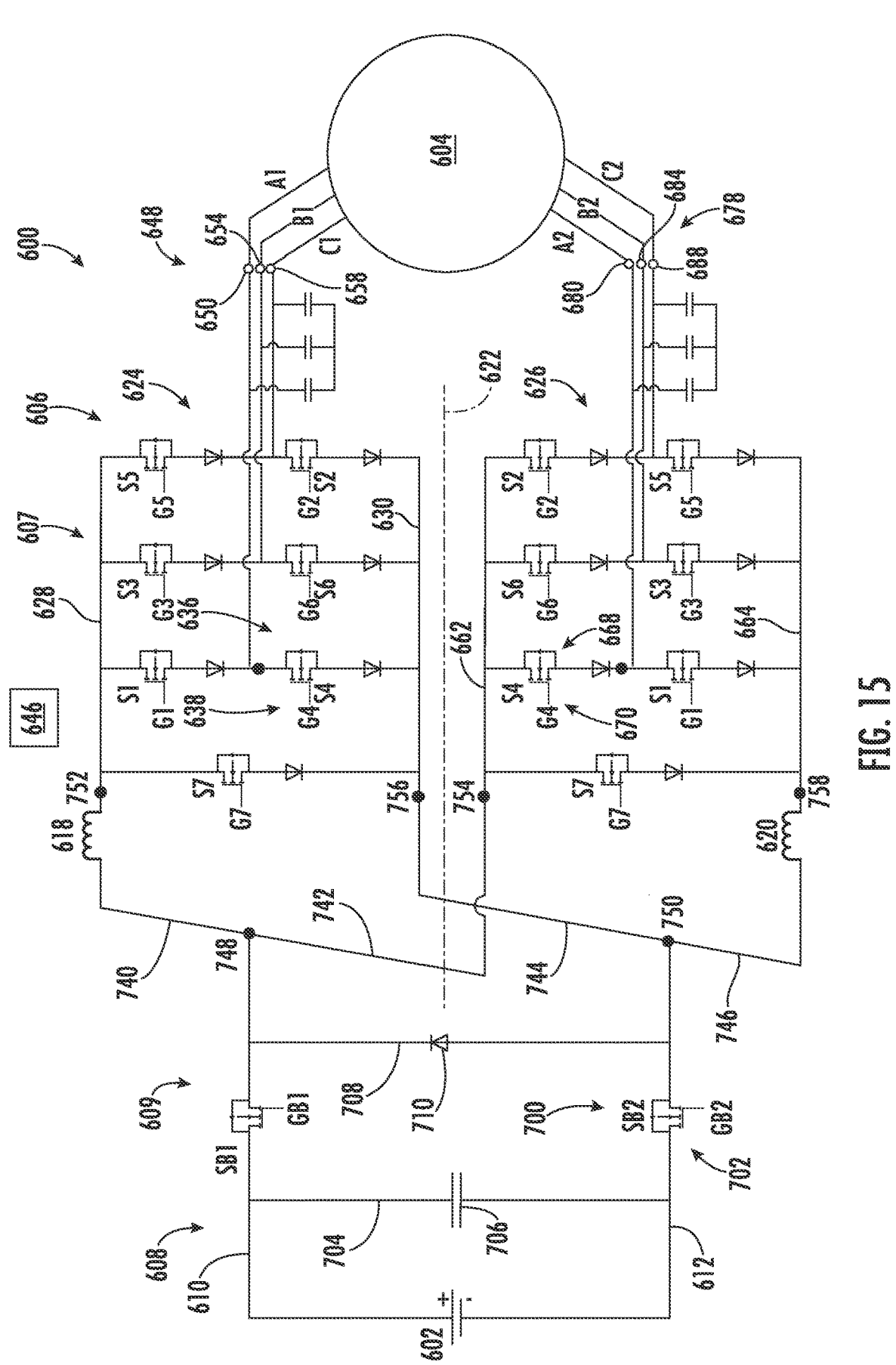

FIG. 15 provides a diagram of an electrical power system 600 according to another example embodiment of the present disclosure. The electrical power system 600 of FIG. 15 is arranged in a similar manner as the electrical power system of FIG. 13 except as provided below. Like or similar parts have retained their designations in FIG. 15 and the accompanying description.

For the depicted embodiment of FIG. 15, the first inverter 624 and the second inverter 626 of the power converter 606 are parallel-connected inverters (whereas the first inverter 624 and the second inverter 626 of the power converter 606 shown in FIG. 13 are series-connected inverters). For this embodiment, the power bus 608 includes a first positive DC-link 740, a second positive DC-link 742, a first negative DC-link 744, and a second negative DC-link 746.

The first positive DC-link 740 and the second positive DC-link 742 are electrically connected to the positive DC-link 610 at a positive DC-link node 748. The first positive DC-link 740 electrically connects the positive DC-link 610 with the outer rail 628 of the first inverter 624 at a first positive node 752. The second positive DC-link 742 electrically connects the positive DC-link 610 with the inner rail 662 of the second inverter 626 at a second positive node 754.

The first negative DC-link 744 and the second negative DC-link 746 are electrically connected to the negative DC-link 612 at a negative DC-link node 750. The first negative DC-link 744 electrically connects the negative DC-link 612 with the inner rail 630 of the first inverter 624 at a first negative node 756. The second negative DC-link 746 electrically connects the negative DC-link 612 with the outer rail 664 of the second inverter 626 at a second negative node 758.

The first inductor 618 is positioned along the first positive DC-link 740 between the positive DC-link node 748 and the first positive node 752. The second inductor 620 is positioned along the second negative DC-link 746 between the negative DC-link node 750 and the second negative node 758. The first inductor 618 and the second inductor 620 are arranged symmetrically with one another with respect to the centerline 622. In some embodiments, in addition or alternatively to the first and second inductors 618, 620, a third inductor can be positioned along the second positive DC-link 742 between the positive DC-link node 748 and the second positive node 754 and a fourth inductor can be positioned along the first negative DC-link 744 between the negative DC-link node 750 and the first negative node 756. In this regard, the third and fourth inductors can be arranged symmetrically with one another with respect to the centerline 622.

It will be appreciated that the first and second switches 636, 668 of the boost stage 607 and the buck switches 700 of the buck stage 609 of the power converter 606 of FIG. 13 can be switched according to a PWM switching scheme to cancel common mode emissions in the boost stage 607 and buck stage 609. Further, advantageously, as the first inverter 624 and the second inverter 626 of the power converter 606 are parallel-connected inverters in the embodiment of FIG. 15, the voltage on the power bus 608 can be half the voltage of what would be needed for series-connected inverters for a given demanded power output of the power converter 606.

Figure 16:
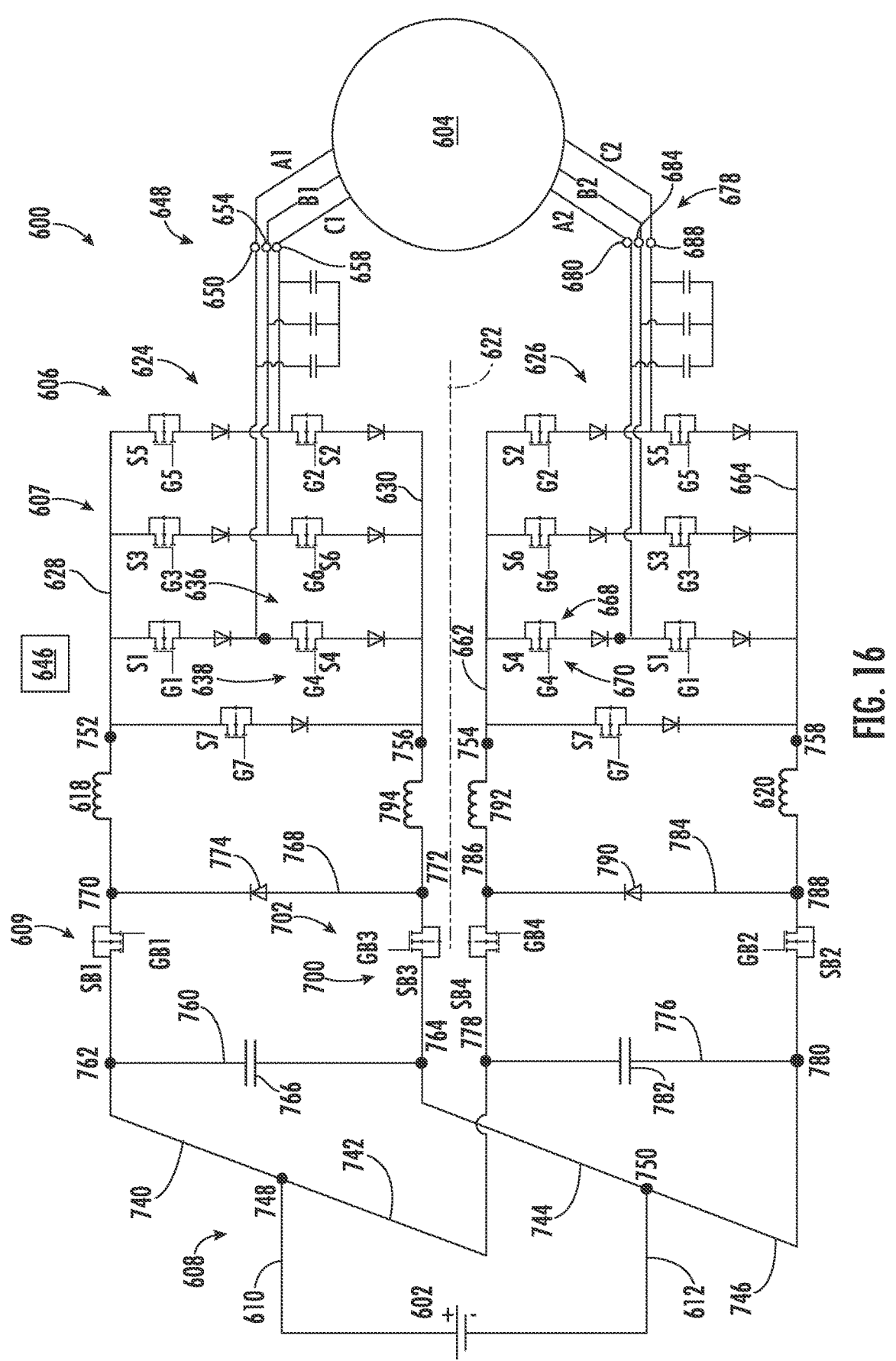

FIG. 16 provides a diagram of an electrical power system 600 according to a further example embodiment of the present disclosure. The electrical power system 600 of FIG. 16 is arranged in a similar manner as the electrical power system of FIG. 15 except as provided below. Like or similar parts have retained their designations in FIG. 16 and the accompanying description.

For the depicted embodiment of FIG. 16, a first capacitor DC-link 760 spans between the first positive DC-link 740 and the first negative DC-link 744. The first capacitor DC-link 760 electrically connects to the first positive DC-link 740 at a first capacitor link node 762 and electrically connects to the first negative DC-link 744 at a second capacitor link node 764. A first DC-link capacitor 766 is positioned along the first capacitor DC-link 760. A first diode DC-link 768 spans between first positive DC-link 740 and first negative DC-link 744. The first diode DC-link 768 electrically connects to the first positive DC-link 740 at a first diode link node 770 and electrically connects to the first negative DC-link 744 at a second diode link node 772. A first DC-link diode 774 is positioned along the first diode DC-link 768.

A second capacitor DC-link 776 spans between the second positive DC-link 742 and the second negative DC-link 746. The second capacitor DC-link 776 electrically connects to the second positive DC-link 742 at a third capacitor link node 778 and electrically connects to the second negative DC-link 746 at a fourth capacitor link node 780. A second DC-link capacitor 782 is positioned along the second capacitor DC-link 776. A second diode DC-link 784 spans between the second positive DC-link 742 and the second negative DC-link 746. The second diode DC-link 784 electrically connects to the second positive DC-link 742 at a third diode link node 786 and electrically connects to the second negative DC-link 746 at a fourth diode link node 788. A second DC-link diode 790 is positioned along the second diode DC-link 784.

As shown in FIG. 16, the first inductor 618 is positioned along the first positive DC-link 740 between the first diode link node 770 and the first positive node 752. The second inductor 620 is positioned along the second negative DC-link 746 between the fourth diode link node 788 and the second negative node 758. The first inductor 618 and the second inductor 620 are arranged symmetrically with one another with respect to the centerline 622. Further, for this embodiment, a third inductor 792 is positioned along the second positive DC-link 742 between the third diode link node 786 and the second positive node 754. A fourth inductor 794 is positioned along the first negative DC-link 744 between the second diode link node 772 and the first negative node 756. In this regard, the third and fourth inductors 792, 794 can be arranged symmetrically with one another with respect to the centerline 622. In other embodiments, optionally, the power converter 606 includes the first and second inductors 618, 620 but not the third and fourth inductors 792, 794.

Further, for the depicted embodiment of FIG. 16, the buck stage 609 is integrated into the parallel architecture of the boost stage 607. As shown, the buck switches 700 include buck switches SB1, SB2, SB3, and SB4 each having respective buck gates GB1, GB2, GB3, GB4 (collectively the buck gates 702). Buck switch SB1 is positioned along the first positive DC-link 740 between the first capacitor link node 762 and the first diode link node 770. Buck switch SB2 is positioned along the 746 between the fourth capacitor link node 780 and the fourth diode link node 788. Buck switches SB1 and SB2 are symmetrically arranged in that buck switch SB1 mirrors the position of buck switch SB2 with respect to the centerline 622. Buck switch SB3 is positioned along the first negative DC-link 744 between the second capacitor link node 764 and the second diode link node 772. Buck switch SB4 is positioned along the second positive DC-link 742 between the third capacitor link node 778 and the third diode link node 786. Buck switches SB3 and SB4 are symmetrically arranged in that buck switch SB3 mirrors the position of buck switch SB4 with respect to the centerline 622.

It will be appreciated that the first and second switches 636, 668 of the boost stage 607 and the buck switches 700 of the buck stage 609 of the power converter 606 of FIG. 16 can be switched according to a PWM switching scheme to cancel common mode emissions in the boost stage 607 and buck stage 609.

Further, the topology of the power converter 606 of FIG. 16 may provide for common mode EMI cancelation or reduction even when the first inverter 624 or the second inverter 626 of the boost stage 607 is shut off or otherwise not operating. For instance, if the first inverter 624 is shut down or otherwise stops operating, the second and third inductors 620, 792 can still reduce common mode EMI associated with the second inverter 626. Similarly, if the second inverter 626 is shut down or otherwise stops operating, the first and fourth inductors 618, 794 can still reduce common mode EMI associated with the first inverter 624. In addition, the inductors and switches of the power converter 606 of FIG. 16 may be subject to less electric current and voltage than in other topologies.

Figure 17:
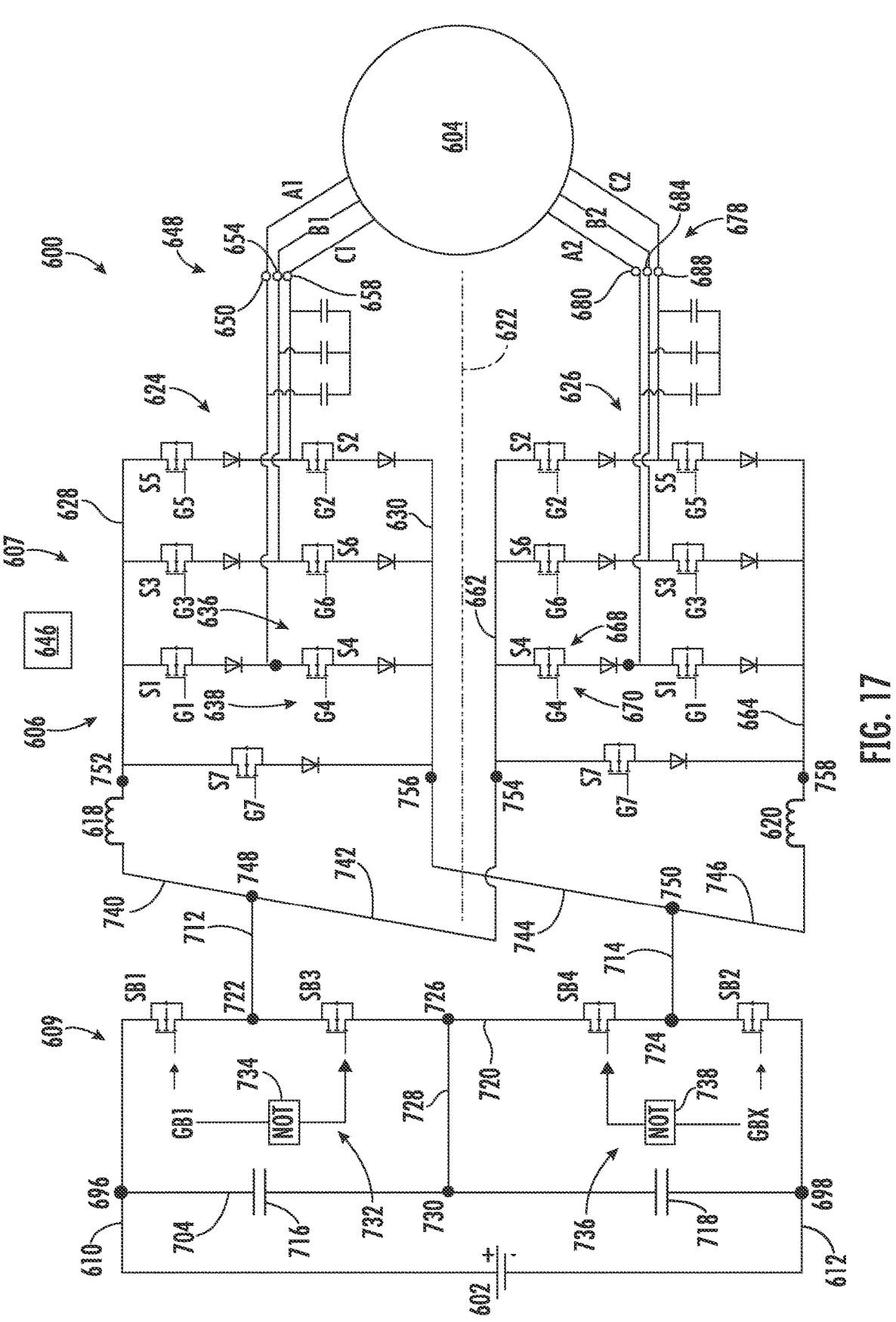

FIG. 17 provides a diagram of an electrical power system 600 according to yet a further example embodiment of the present disclosure. The electrical power system 600 of FIG. 17 is arranged in a similar manner as the electrical power system of FIG. 14 and the electrical power system of FIG. 15 except as provided below. Particularly, FIG. 17 provides a parallel architecture version of the series architecture version of FIG. 14. Like or similar parts have retained their designations in FIG. 17 and the accompanying description.

For the depicted embodiment of FIG. 17, the buck stage 609 is configured in the same manner as the buck stage of FIG. 14. However, in this example embodiment, the first inverter 624 and the second inverter 626 of the power converter 606 are parallel-connected inverters like the parallel-connected inverters of FIG. 15 (whereas the first inverter 624 and the second inverter 626 of the power converter 606 shown in FIG. 14 are series-connected inverters).

As shown in FIG. 17, the first stage connector DC-link 712 electrically connects to the positive DC-link node 748. The first positive DC-link 740 and the second positive DC-link 742 are both electrically connected to the positive DC-link node 748 as well. In this way, the first stage connector DC-link 712 electrically couples the main buck link 720 with the positive rails (the outer rail 628 and the inner rail 662) of the parallel-connected first and second inverters 624, 626 of the boost stage 607. The second stage connector DC-link 714 electrically connects to the negative DC-link node 750. The first negative DC-link 744 and the second negative DC-link 746 are both electrically connected to the negative DC-link node 750 as well. Thus, the second stage connector DC-link 714 electrically couples the main buck link 720 with the negative rails (the inner rail 630 and the outer rail 664) of the parallel-connected first and second inverters 624, 626 of the boost stage 607. Consequently, the buck stage 609 of FIG. 17 is electrically coupled with the parallel-connected first and second inverters 624, 626 of the boost stage 607.

Like in the embodiment of FIG. 14, the first buck switch SB1 and the third buck switch SB3 are positioned on opposite sides of the first main buck node 722 with the third buck switch SB3 being positioned between the first main buck node 722 and the mid-buck node 726. The second buck switch SB2 and the fourth buck switch SB4 are positioned on opposite sides of the second main buck node 724 with the fourth buck switch SB4 being positioned between the second main buck node 724 and the mid-buck node 726.

Like in the embodiment of FIG. 15, the first inductor 618 of FIG. 17 is positioned along the first positive DC-link 740 between the positive DC-link node 748 and the first positive node 752. The second inductor 620 of FIG. 17 is positioned along the second negative DC-link 746 between the negative DC-link node 750 and the second negative node 758. The first inductor 618 and the second inductor 620 are arranged symmetrically with one another with respect to the centerline 622. In some embodiments, in addition or alternatively to the first and second inductors 618, 620, a third inductor can be positioned along the second positive DC-link 742 between the positive DC-link node 748 and the second positive node 754 and a fourth inductor can be positioned along the first negative DC-link 744 between the negative DC-link node 750 and the first negative node 756. In this regard, the third and fourth inductors can be arranged symmetrically with one another with respect to the centerline 622.

It will be appreciated that the first and second switches 636, 668 of the boost stage 607 and the buck switches 700 of the buck stage 609 of the power converter 606 of FIG. 16 can be switched according to a PWM switching scheme to cancel common mode emissions in the boost stage 607 and buck stage 609. In addition, advantageously, the circuit topology and arrangement of the buck switches 700 in FIG. 17 is beneficial in that the buck switches 700 are subject to reduced voltage stress compared to other topologies.

FIG. 18 provides a flow diagram for a method 800 of operating a power converter, such as any one of the power converters 406 of FIGS. 4, 6, 7, and 8.

At 802, the method 800 includes switching first switches of a first inverter and second switches of a second inverter electrically coupled with the first inverter in a pulse width modulated switching scheme so that the first switches are pulse width modulated to generate a first common mode signal and so that the second switches are pulse width modulated to generate a second common mode signal that is one hundred eighty degrees (180°) out of phase with the first common mode signal, the first switches of the first inverter and the second switches of the second inverter being arranged symmetrically with respect to a centerline defined by the power converter.

In example implementations, the first inverter and the second inverter can be series-connected, e.g., as in the embodiment shown in FIG. 4, or parallel-connected, e.g., as in the embodiment shown in FIG. 6, 7, or 8. The positions of the first switches of the first inverter can mirror their respective corresponding second switches of the second inverter. The first switches can be pulse width modulated to generate first PWM signals, e.g., for each phase of power the first inverter is configured to output. The first PWM signals collectively render or generate a first common mode signal, e.g., as shown in FIG. 5. Likewise, the second switches can be pulse width modulated to generate second PWM signals, e.g., for each phase of power the second inverter is configured to output. The second PWM signals collectively render or generate a second common mode signal, e.g., as shown in FIG. 5. In accordance with the PWM switching scheme, the first and second common mode signals are one hundred eighty degrees (180°) out of phase with one another. Stated another way, the first and second common mode signals have a same waveform but with opposite polarity. In this regard, common mode emissions generated by switching transients of the first and second switches can be eliminated or reduced.

By way of example, the method 800 can be used to control the power converter 406 of any one of the embodiments of FIG. 4, 6, 7, or 8. At 802, the method 800 can include switching the first switches 436 of the first inverter 424 in a pulse width modulated switching scheme to generate first PWM signals for each phase of power A1, B1, C1. Generating the first PWM signals for each phase of power A1, B1, C1 generates or renders a first common mode signal, e.g., such as the first common mode signal CMV-1 having a waveform and polarity shown in FIG. 5. Further, at 802, the method 800 can include switching the second switches 468 of the second inverter 426 in a pulse width modulated switching scheme to generate second PWM signals for each phase of power A2, B2, C2. Generating the second PWM signals for each phase of power A2, B2, C2 generates or renders a second common mode signal, e.g., such as the second common mode signal CMV-2 having a waveform and polarity shown in FIG. 5. In accordance with the PWM switching scheme, the first common mode signal CMV-1 and the second common mode signal CMV-2 are one hundred eighty degrees (180°) out of phase with one another, which provides common mode emission cancelation or reduction, e.g., as shown by the CMV-1+CMV-2 line in FIG. 5.

FIG. 19 provides a flow diagram for a method 900 of operating a buck-boost power converter, such as any one of the buck-boost power converters 606 disclosed herein.

At 902, the method 900 includes switching first switches of a first inverter and second switches of a second inverter electrically coupled with the first inverter in a pulse width modulated switching scheme so that the first switches are pulse width modulated to generate a first common mode signal and so that the second switches are pulse width modulated to generate a second common mode signal that is one hundred eighty degrees (180°) out of phase with the first common mode signal, the first switches of the first inverter and the second switches of the second inverter being arranged symmetrically with respect to a centerline defined by the power converter, the first inverter and the second inverter together forming at least part of a boost stage of the power converter.

At 904, the method 900 includes switching a first buck switch and a second buck switch in the pulse width modulated switching scheme so that the first buck switch is pulse width modulated to generate a first buck common mode signal and so that the second buck switch is pulse width modulated to generate a second buck common mode signal that is one hundred eighty degrees (180°) out of phase with the first buck common mode signal, the first buck switch and the second buck switch forming at least a part of a buck stage that is electrically coupled with the boost stage.

For instance, the first inverter and the second inverter of the boost stage can be series-connected, e.g., as in any one of the embodiments shown in FIG. 9, 11, 12, 13, or 14, or parallel-connected, e.g., as in any of the embodiments shown in FIG. 15, 16, or 17. The positions of the first switches of the first inverter can mirror their respective corresponding second switches of the second inverter. The first switches can be pulse width modulated to generate first PWM signals, e.g., for each phase of power the first inverter is configured to output. The first PWM signals collectively render or generate a first common mode signal, e.g., as shown in FIG. 5. Likewise, the second switches can be pulse width modulated to generate second PWM signals, e.g., for each phase of power the second inverter is configured to output. The second PWM signals collectively render or generate a second common mode signal. In accordance with the PWM switching scheme, the first and second common mode signals are one hundred eighty degrees (180°) out of phase with one another. Stated another way, the first and second common mode signals have a same waveform but with opposite polarity. In this regard, common mode emissions generated by switching transients of the first and second switches can be eliminated or reduced.

The position of the first buck switch can mirror the position of the second buck switch of the buck stage. The first buck switch can be pulse width modulated to generate a first buck PWM signal. The first buck PWM signal renders or generates a first buck common mode signal, e.g., as shown in FIG. 10. Similarly, the second buck switch can be pulse width modulated to generate a second buck PWM signal. The second buck PWM signal renders or generates a second buck common mode signal, e.g., as shown in FIG. 10. In accordance with the PWM switching scheme, the first and second buck common mode signals are one hundred eighty degrees (180°) out of phase with one another. Stated another way, the first and second buck common mode signals have a same waveform but with opposite polarity. In this regard, common mode emissions generated by switching transients of the first and second buck switches can be eliminated or reduced. Accordingly, the method 900 can be implemented to cancel common mode emissions in both the boost and buck stages of the buck-boost power converter.

In yet another method, the aspects of 904 of the method 900 can be implemented to eliminate or reduce common mode emissions generated by the buck stage regardless of whether 902 is implemented to eliminate or reduce common mode emissions generated by the boost stage.

By way of example, the method 900 can be used to control the power converter 606 of any one of the embodiments of FIG. 9, 11, 12, 13, 14, 15, 16, or 17. At 902, the method 900 can include switching the first switches 636 of the first inverter 624 in a pulse width modulated switching scheme to generate first PWM signals for each phase of power A1, B1, C1. Generating the first PWM signals for each phase of power A1, B1, C1 generates or renders a first common mode signal, e.g., such as the first common mode signal CMV-1 having a waveform and polarity shown in FIG. 5. Further, at 902, the method 900 can include switching the second switches 668 of the second inverter 626 in a pulse width modulated switching scheme to generate second PWM signals for each phase of power A2, B2, C2. Generating the second PWM signals for each phase of power A2, B2, C2 generates or renders a second common mode signal, e.g., such as the second common mode signal CMV-2 having a waveform and polarity shown in FIG. 5. In accordance with the PWM switching scheme, the first common mode signal CMV-1 and the second common mode signal CMV-2 are one hundred eighty degrees (180°) out of phase with one another, which provides common mode emission cancellation or reduction in the boost stage 607 of the power converter 606.

In addition, at 904, the method 900 can include switching the first buck switch SB1 in the pulse width modulated switching scheme so that the first buck switch SB1 is pulse width modulated to generate a first buck common mode signal, such as the first buck common mode signal CMV-1-B having a waveform and polarity shown in FIG. 10. Further, at 904, the method 900 can include switching the second buck switch SB2 in the pulse width modulated switching scheme so that the second buck switch SB2 is pulse width modulated to generate a second buck common mode signal, such as the second buck common mode signal CMV-2-B having a waveform and polarity shown in FIG. 10. In accordance with the PWM switching scheme, the first buck common mode signal CMV-1-B and the second buck common mode signal CMV-2 are one hundred eighty degrees (180°) out of phase with one another, which provides common mode emission cancelation or reduction in the buck stage 609 of the power converter 606.

Figure 20:
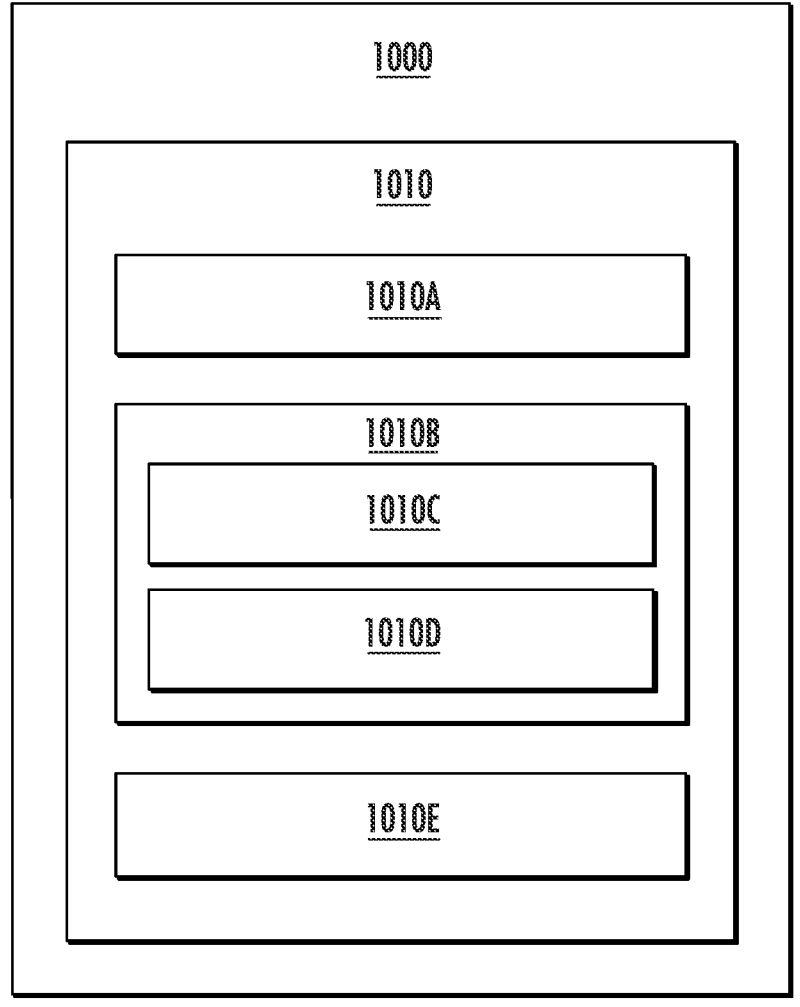
FIG. 20 is a system diagram of a computing system according to example embodiments of the present disclosure.

FIG. 20 provides an example computing system 1000 according to example embodiments of the present disclosure. The computing elements or systems described herein can include one, some, or all the components of the computing system 1000 and can execute operations as described below.

As shown in FIG. 20, the computing system 1000 can include one or more computing device(s) 1010. The computing device 64, engine controllers, the supervisor controller 59, the controllers controlling the various power converters (e.g., 464, 646), etc. may embody one or more of the components of the computing device(s) 1010. The computing device(s) 1010 can include one or more processor(s) 1010A and one or more memory device(s) 1010B. The one or more processor(s) 1010A can include any processing device, such as a microprocessor, microcontroller, integrated circuit, logic device, and/or other suitable processing device. The one or more memory device(s) 1010B can include one or more computer-readable media, including, but not limited to, a non-transitory computer-readable medium, RAM, ROM, hard drives, flash drives, and/or other memory devices.

The one or more memory device(s) 1010B can store information accessible by the one or more processor(s) 1010A, including computer-executable or computer-readable instructions 1010C that can be executed by the one or more processor(s) 1010A. The instructions 1010C can be any set of instructions that when executed by the one or more processor(s) 1010A, cause the one or more processor(s) 1010A to perform operations. In some embodiments, the instructions 1010C can be executed by the one or more processor(s) 1010A to cause the one or more processor (s) 1010A to perform operations, such as any of the operations and functions for which the computing system 1000 and/or the computing device(s) 1010 are configured. The instructions 1010C can be software written in any programming language or can be implemented in hardware. Additionally, and/or alternatively, the instructions 1010C can be executed in logically and/or virtually separate threads on processor(s) 1010A. The memory device(s) 1010B can further store data 1010D that can be accessed by the processor(s) 1010A.

The computing device(s) 1010 can also include a network interface 1010E used to communicate, for example, with the other components of the computing system 1000 (e.g., via a network). The network interface 1010E can include components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The inventive aspects of the present disclosure can be implemented in a wide variety of electrical power applications. For instance, the inventive aspects can be implemented on a wide variety of vehicles, such as aircraft (helicopters or fixed-wing aircraft), automobiles, boats, submarines, trains, amphibious vehicles, unmanned aerial vehicles or drones, spacecraft, and/or on any other vehicle. Further, the inventive aspects can be implemented on a wide variety of other applications, such as power generation applications, machine tools, industrial applications, oil and gas applications, etc.

The power converter topologies provided herein may provide certain advantages, benefits, and technical effects, such as cancelation or reduction of common EMI generated during switching transients. This allows for elimination or reduction of EMI filters, which may reduce the weight and size of the power converter. This is especially useful in applications in which space is at a premium and weight is of particular importance, such as in aviation applications. The power converter topologies are also particularly suitable for high-voltage/high-current/high-power applications and can achieve higher fault tolerance than current state-of-art power converters. Depending on the power converter, cancelation or reduction of common mode emissions in the boost and/or the buck stage can be achieved. The power converters provided herein may have other benefits and advantages than those expressly noted herein.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

Boost Power Converter

1. A power converter defining a centerline, the power converter comprising: a first inverter electrically coupled with a direct current power bus and having a first multi-phase output and a plurality of first switches; a second inverter electrically coupled with the direct current power bus and the first inverter, the second inverter having a second multi-phase output and a plurality of second switches, the first switches of the first inverter and the second switches of the second inverter being arranged symmetrically with respect to the centerline; and one or more processors configured to: cause the first switches and the second switches to switch in accordance with a pulse width modulated switching scheme so that the first switches of the first inverter are pulse width modulated to generate a first common mode signal and so that the second switches of the second inverter are pulse width modulated to generate a second common mode signal that is one hundred eighty degrees out of phase with the first common mode signal.

2. The power converter of any preceding clause, wherein the first multi-phase output is a three-phase output and the second multi-phase output is a three-phase output.

3. The power converter of any preceding clause, wherein the first inverter is electrically coupled with the second inverter in series.

4. The power converter of any preceding clause, wherein the first inverter has an outer rail and an inner rail and the second inverter has an outer rail and an inner rail, the inner rail of the first inverter and the inner rail of the second inverter being electrically connected so as to electrically couple the first inverter and the second inverter in series.

5. The power converter of any preceding clause, wherein the outer rail of the first inverter is electrically connected to a positive DC-link of the direct current power bus and the outer rail of the second inverter is electrically connected to a negative DC-link of the direct current power bus, and wherein a first inductor is positioned along the positive DC-link and a second inductor is positioned along the negative DC-link.

6. The power converter of any preceding clause, wherein the first inverter is electrically coupled with the second inverter in parallel.

7. The power converter of any preceding clause, wherein the first inverter has an outer rail and an inner rail and the second inverter has an outer rail and an inner rail, and wherein a first positive DC-link of the direct current power bus is electrically connected with the outer rail of the first inverter and a second positive DC-link of the direct current power bus is electrically connected to the inner rail of the second inverter, the first positive DC-link and the second positive DC-link being electrically connected at a positive DC-link node, and wherein a first negative DC-link of the direct current power bus is electrically connected with the inner rail of the first inverter and a second negative DC-link of the direct current power bus is electrically connected to the outer rail of the second inverter, the first negative DC-link and the second negative DC-link being electrically connected at a negative DC-link node.

8. The power converter of any preceding clause, wherein a first inductor is positioned along the first positive DC-link and a second inductor is positioned along the second negative DC-link, the first inductor and the second inductor are symmetrically arranged.

9. The power converter of any preceding clause, wherein a first inductor is positioned along the first positive DC-link, a second inductor is positioned along the second negative DC-link, a third inductor is positioned along the second positive DC-link, and a fourth inductor is positioned along the first negative DC-link, the first inductor and the second inductor are symmetrically arranged and the third inductor and the fourth inductor are symmetrically arranged.

10. The power converter of any preceding clause, wherein a positive external DC-link of the direct current power bus is electrically connected to the positive DC-link node, and a negative external DC-link of the direct current power bus is electrically connected to the negative DC-link node, and wherein a first inductor is positioned along the positive external DC-link and a second inductor is positioned along the negative external DC-link, the first inductor and the second inductor are symmetrically arranged.

11. The power converter of any preceding clause, wherein a DC-link spans between and electrically connects the positive external DC-link and the negative external DC-link, and wherein the first inductor is positioned along the positive external DC-link between the positive DC-link node and where the DC-link electrically connects to the positive external DC-link, and wherein the second inductor is positioned along the negative external DC-link between the negative DC-link node and where the DC-link electrically connects to the negative external DC-link.

12. The power converter of any preceding clause, wherein a DC-link capacitor is positioned along the DC-link.

13. The power converter of any preceding clause, wherein the first inverter and the second inverter are both current source inverters.

14. The power converter of any preceding clause, wherein the direct current power bus is electrically coupled with a power source, wherein the power source is a current source.

15. The power converter of any preceding clause, wherein the first multi-phase output and the second multi-phase output are electrically coupled with an electric machine.

16. The power converter of any preceding clause, wherein the electric machine is a component of an electric propulsion assembly of an aircraft, the electric machine being mechanically coupled with a fan for driving the fan to produce thrust for the aircraft.

17. The power converter of any preceding clause, wherein the electric machine is a six-phase electric machine.

18. The power converter of any preceding clause, wherein the first inverter and the second inverter each have an outer rail, an inner rail, a first leg, a second leg, and a third leg each spanning between the outer rail and the inner rail, the inner rail of the first inverter being closer to the centerline than the outer rail of the first inverter and the inner rail of the second inverter being closer to the centerline than the outer rail of the second inverter, and wherein the first switches and the second switches each include a first switch and a fourth switch positioned along the first leg of the first inverter and the second inverter, respectively, a third switch and a sixth switch positioned along the second leg of the first inverter and the second inverter, respectively, and a fifth switch and a second switch positioned along the third leg of the first inverter and the second inverter, respectively, and wherein the first, third, and fifth switches of the first switches are positioned closer to the outer rail of the first inverter than the fourth, sixth, and second switches of the first switches, and the first, third, and fifth switches of the second switches are positioned closer to the outer rail of the second inverter than the fourth, sixth, and second switches of the second switches.

19. A propulsion system, comprising: a direct current power bus; a power source electrically coupled with the direct current power bus; an electric propulsion assembly having a fan and an electric machine mechanically coupled with the fan; a power converter defining a centerline, the power converter comprising: a first inverter electrically coupled with the direct current power bus and having a first multi-phase output electrically coupled with the electric machine and a plurality of first switches driven by respective first gates; a second inverter electrically coupled with the direct current power bus and the first inverter, the second inverter having a second multi-phase output electrically coupled with the electric machine and a plurality of second switches driven by respective second gates, the first switches of the first inverter and the second switches of the second inverter being arranged symmetrically with respect to the centerline; and one or more processors configured to: cause the first switches and the second switches to switch in a pulse width modulated switching scheme so that the first switches of the first inverter are pulse width modulated to generate a first common mode signal and so that the second switches of the second inverter are pulse width modulated to generate a second common mode signal that is one hundred eighty degrees out of phase with the first common mode signal.

20. A non-transitory computer readable medium comprising computer-executable instructions that, when executed by one or more processors associated with a power converter of an electrical power system, cause the one or more processors to: cause first switches of a first inverter and second switches of a second inverter electrically coupled with the first inverter to switch according to a pulse width modulated switching scheme so that the first switches are pulse width modulated to generate a first common mode signal and so that the second switches are pulse width modulated to generate a second common mode signal that is one hundred eighty degrees out of phase with the first common mode signal, the first switches of the first inverter and the second switches of the second inverter being arranged symmetrically with respect to a centerline defined by the power converter.

20A. A method of operating a power converter, comprising: switching first switches of a first inverter and second switches of a second inverter electrically coupled with the first inverter in a pulse width modulated switching scheme so that the first switches are pulse width modulated to generate a first common mode signal and so that the second switches are pulse width modulated to generate a second common mode signal that is one hundred eighty degrees out of phase with the first common mode signal, the first switches of the first inverter and the second switches of the second inverter being arranged symmetrically with respect to a centerline defined by the power converter.

20B. A power converter, comprising: a first means for generating a first common mode signal; a second means for generating a second common mode signal, the first and second common mode signals being generated so as to be one hundred eighty degrees out of phase with one another.

20C. The power converter of any preceding clause, wherein the first and second common mode signals have a same waveform but opposite polarity.

Buck-Boost Power Converter

21. A buck-boost power converter, comprising: a boost stage; and a buck stage electrically coupled with the boost stage, the buck stage having a first buck switch and a second buck switch being arranged symmetrically with one another.

22. The buck-boost power converter of any preceding clause, wherein the buck-boost power converter defines a centerline, and wherein the first buck switch mirrors a position of the second buck switch with respect to the centerline.

23. The buck-boost power converter of any preceding clause, further comprising: one or more processors configured to: cause the first buck switch and the second buck switch to switch according to a pulse width modulated switching scheme so that the first buck switch is pulse width modulated to generate a first buck common mode signal and so that the second buck switch is pulse width modulated to generate a second buck common mode signal that is one hundred eighty degrees out of phase with the first buck common mode signal.

24. The buck-boost power converter of any preceding clause, wherein the boost stage has a first inverter and a second inverter electrically coupled with the first inverter, the first inverter having first switches and the second inverter having second switches, the first switches and the second switches being arranged symmetrically with one another.

25. The buck-boost power converter of any preceding clause, further comprising: one or more processors configured to: cause the first switches and the second switches to switch according to a pulse width modulated switching scheme so that the first switches of the first inverter are pulse width modulated to generate a first common mode signal and so that the second switches of the second inverter are pulse width modulated to generate a second common mode signal that is one hundred eighty degrees out of phase with the first common mode signal; and cause the first buck switch and the second buck switch to switch according to the pulse width modulated switching scheme so that the first buck switch is pulse width modulated to generate a first buck common mode signal and so that the second buck switch is pulse width modulated to generate a second buck common mode signal that is one hundred eighty degrees out of phase with the first buck common mode signal.

26. The buck-boost power converter of any preceding clause, wherein the first inverter is electrically coupled with the second inverter in series.

27. The buck-boost power converter of any preceding clause, wherein the first inverter has an inner rail and an outer rail and the second inverter has an inner rail and an outer rail, and wherein a positive DC-link is electrically coupled with the outer rail of the first inverter, a negative DC-link is electrically coupled with the outer rail of the second inverter, and a connector link electrically connects the inner rail of first inverter and the inner rail of the second inverter, and wherein the first buck switch is positioned along the positive DC-link and the second buck switch is positioned along the negative DC-link.

28. The buck-boost power converter of any preceding clause, further comprising: a first inductor positioned along the positive DC-link between the first buck switch and a first node that electrically connects the positive DC-link and the outer rail of the first inverter; and a second inductor positioned along the negative DC-link between the second buck switch and a second node that electrically connects the negative DC-link and the outer rail of the second inverter, and wherein the first inductor and the second inductor are symmetrically arranged.

29. The buck-boost power converter of any preceding clause, further comprising: a third buck switch; and a fourth buck switch, and wherein a first DC-link spans between and connects the positive DC-link and the connector link, the first DC-link electrically connecting to the connector link at a third DC-link node, and wherein a second DC-link spans between and connects the negative DC-link and the connector link, the second DC-link electrically connecting to the connector link at a fourth DC-link node, and wherein the first buck switch is positioned along the positive DC-link, the second buck switch is positioned along the negative DC-link, the third buck switch is positioned along the connector link between the third DC-link node and a first connector node that electrically connects the connector link and the inner rail of the first inverter, and the fourth buck switch is positioned along the connector link between the fourth DC-link node and a second connector node that electrically connects the connector link and the inner rail of the second inverter.

30. The buck-boost power converter of any preceding clause, further comprising: a third inductor positioned along the connector link between the third buck switch and a first connector node that electrically connects the connector link and the inner rail of the first inverter; and a fourth inductor positioned along the connector link between the fourth buck switch and a second connector node that electrically connects the connector link and the inner rail of the second inverter, and wherein the third inductor and the fourth inductor are symmetrically arranged.

31. The buck-boost power converter of any preceding clause, further comprising: one or more processors configured to: cause the first buck switch, the second buck switch, the third buck switch, and the fourth buck switch to switch according to a pulse width modulated switching scheme so that the first buck switch and the third buck switch are pulse width modulated to generate a first buck common mode signal and so that the second buck switch and the fourth buck switch are pulse width modulated to generate a second buck common mode signal that is one hundred eighty degrees out of phase with the first buck common mode signal.

32. The buck-boost power converter of any preceding clause, wherein the one or more processors are further configured to: in response to the first inverter being shut off, adjust the pulse width modulated switching scheme to render an adjusted pulse width modulated switching scheme; and cause the second buck switch and the fourth buck switch to switch according to the adjusted pulse width modulated switching scheme so that the second buck switch is pulse width modulated to generate a first adjusted buck common mode signal and so that the fourth buck switch is pulse width modulated to generate a second adjusted buck common mode signal that is one hundred eighty degrees out of phase with the first adjusted buck common mode signal.

33. The buck-boost power converter of any preceding clause, further comprising: a capacitor DC-link spanning between and electrically connecting the positive DC-link and the negative DC-link; a DC-link capacitor being positioned along the capacitor DC-link; a diode DC-link spanning between and electrically connecting the positive DC-link and the negative DC-link; and a DC-link diode being positioned along the diode DC-link, and wherein the connector link directly electrically connects the inner rail of the first inverter and the inner rail of the second inverter, and wherein the first buck switch is positioned along the positive DC-link between where the capacitor DC-link and the diode DC-link electrically connect to the positive DC-link and the second buck switch is positioned along the negative DC-link between where the capacitor DC-link and the diode DC-link electrically connect to the negative DC-link.

34. The buck-boost power converter of any preceding clause, further comprising: a third buck switch; and a fourth buck switch symmetrically arranged with the third buck switch, and wherein a first NOT gate is positioned between the first buck switch and the third buck switch and a second NOT gate is positioned between the second buck switch and the fourth buck switch.

35. The buck-boost power converter of any preceding clause, wherein the first inverter is electrically coupled with the second inverter in parallel.

36. The buck-boost power converter of any preceding clause, wherein the first inverter has an inner rail and an outer rail and the second inverter has an inner rail and an outer rail, and wherein a positive DC-link is electrically coupled with the outer rail of the first inverter via a first positive DC-link and with the inner rail of the second inverter via a second positive DC-link, and wherein a negative DC-link is electrically coupled with the inner rail of the first inverter via a first negative DC-link and with the outer rail of the second inverter via a second negative DC-link, and wherein the first buck switch is positioned along the positive DC-link and the second buck switch is positioned along the negative DC-link.

37. The buck-boost power converter of any preceding clause, further comprising: a third buck switch; and a fourth buck switch, and wherein the first inverter has an inner rail and an outer rail and the second inverter has an inner rail and an outer rail, wherein a positive DC-link is electrically coupled with the outer rail of the first inverter via a first positive DC-link and with the inner rail of the second inverter via a second positive DC-link, wherein a negative DC-link is electrically coupled with the inner rail of the first inverter via a first negative DC-link and with the outer rail of the second inverter via a second negative DC-link, and wherein the first buck switch is positioned along the first positive DC-link, the second buck switch is positioned along the second negative DC-link, the third buck switch is positioned along the first negative DC-link, and the fourth buck switch is positioned along the second positive DC-link.

38. The buck-boost power converter of any preceding clause, wherein the boost stage has parallel-connected inverters, and wherein the buck-boost power converter further comprises: a main buck link; a first stage connector DC-link electrically coupling the main buck link with positive rails of the parallel-connected inverters, the first stage connector DC-link electrically connecting to the main buck link at a first main buck node; a second stage connector DC-link coupling the main buck link with negative rails of the parallel-connected inverters, the second stage connector DC-link electrically connecting to the main buck link at a second main buck node; a cross DC-link electrically connected to the main buck link at a mid-buck node; a third buck switch; and a fourth buck switch, and wherein the first buck switch and the third buck switch are positioned on opposite sides of the first main buck node with the third buck switch being positioned between the first main buck node and the mid-buck node, the second buck switch and the fourth buck switch are positioned on opposite sides of the second main buck node with the fourth buck switch being positioned between the second main buck node and the mid-buck node, and wherein a first NOT gate is positioned between the first buck switch and the third buck switch and a second NOT gate is positioned between the second buck switch and the fourth buck switch.

39. A buck-boost power converter defining a centerline, the buck-boost power converter comprising: a boost stage, comprising: a first inverter electrically having a plurality of first switches; a second inverter electrically coupled with the first inverter, the second inverter having a plurality of second switches, the first switches of the first inverter and the second switches of the second inverter being arranged symmetrically with one another with respect to the centerline; a buck stage electrically coupled with the boost stage, the buck stage comprising: a first buck switch and a second buck switch arranged symmetrically with one another; and one or more processors configured to: cause the first buck switch and the second buck switch to switch according to a pulse width modulated switching scheme so that the first buck switch is pulse width modulated to generate a first buck common mode signal and so that the second buck switch is pulse width modulated to generate a second buck common mode signal that is one hundred eighty degrees out of phase with the first buck common mode signal; and cause the first switches and the second switches to switch according to a pulse width modulated switching scheme so that the first switches of the first inverter are pulse width modulated to generate a first common mode signal and so that the second switches of the second inverter are pulse width modulated to generate a second common mode signal that is one hundred eighty degrees out of phase with the first common mode signal.

40. A non-transitory computer readable medium comprising computer-executable instructions that, when executed by one or more processors associated with a buck-boost power converter of an electrical power system, cause the one or more processors to: cause first switches of a first inverter and second switches of a second inverter electrically coupled with the first inverter to switch according to a pulse width modulated switching scheme so that the first switches are pulse width modulated to generate a first common mode signal and so that the second switches are pulse width modulated to generate a second common mode signal that is one hundred eighty degrees out of phase with the first common mode signal, the first switches of the first inverter and the second switches of the second inverter being arranged symmetrically with respect to a centerline defined by the buck-boost power converter, the first inverter and the second inverter together forming at least part of a boost stage of the buck-boost power converter; and cause a first buck switch and a second buck switch to switch according to the pulse width modulated switching scheme so that the first buck switch is pulse width modulated to generate a first buck common mode signal and so that the second buck switch is pulse width modulated to generate a second buck common mode signal that is one hundred eighty degrees out of phase with the first buck common mode signal, the first buck switch and the second buck switch forming at least a part of a buck stage that is electrically coupled with the boost stage.

40A. A propulsion system, comprising: a direct current power bus; a power source electrically coupled with the direct current power bus; an electric propulsion assembly having a fan and an electric machine mechanically coupled with the fan; a buck-boost power converter defining a centerline, the buck-boost power converter comprising: a boost stage including a first inverter and a second inverter electrically coupled with the first inverter, the first inverter having a plurality of first switches the second inverter having a plurality of second switches, the first switches and the second switches being arranged symmetrically with one another with respect to the centerline; a buck stage electrically coupled with the boost stage, the buck stage including a first buck switch and a second buck switch arranged symmetrically with one another with respect to the centerline; and one or more processors configured to: cause the first buck switch and the second buck switch to switch according to a pulse width modulated switching scheme so that the first buck switch is pulse width modulated to generate a first buck common mode signal and so that the second buck switch is pulse width modulated to generate a second buck common mode signal that is one hundred eighty degrees out of phase with the first buck common mode signal; and cause the first switches and the second switches to switch according to a pulse width modulated switching scheme so that the first switches of the first inverter are pulse width modulated to generate a first common mode signal and so that the second switches of the second inverter are pulse width modulated to generate a second common mode signal that is one hundred eighty degrees out of phase with the first common mode signal.

40B. A method of operating a buck-boost power converter, comprising: switching first switches of a first inverter and second switches of a second inverter electrically coupled with the first inverter in a pulse width modulated switching scheme so that the first switches are pulse width modulated to generate a first common mode signal and so that the second switches are pulse width modulated to generate a second common mode signal that is one hundred eighty degrees out of phase with the first common mode signal, the first switches of the first inverter and the second switches of the second inverter being arranged symmetrically with respect to a centerline defined by the buck-boost power converter, the first inverter and the second inverter together forming at least part of a boost stage of the buck-boost power converter; and switching a first buck switch and a second buck switch in the pulse width modulated switching scheme so that the first buck switch is pulse width modulated to generate a first buck common mode signal and so that the second buck switch is pulse width modulated to generate a second buck common mode signal that is one hundred eighty degrees out of phase with the first buck common mode signal, the first buck switch and the second buck switch forming at least a part of a buck stage that is electrically coupled with the boost stage.

40C. A buck-boost power converter, comprising: a first boost stage means for generating a first common mode signal; a second boost stage means for generating a second common mode signal, the first and second common mode signals being generated so as to be one hundred eighty degrees out of phase with one another; a first buck stage means for generating a first buck common mode signal; and a second buck stage means for generating a second buck common mode signal, the first and second buck common mode signals being generated so as to be one hundred eighty degrees out of phase with one another.

41. The buck-boost power converter of any preceding clause, wherein the first and second common mode signals have a same waveform but opposite polarity.

42. The buck-boost power converter of any preceding clause, wherein the first and second buck common mode signals have a same waveform but opposite polarity.

We claim:
1. A power converter defining a centerline, the power converter comprising:
a buck stage having a first buck switch and a second buck switch arranged symmetrically with one another with respect to the centerline; and
a boost stage electrically coupled with the buck stage, the boost stage comprising:
a first inverter electrically coupled with a direct current power bus and having a first multi-phase output and a plurality of first switches;
a second inverter electrically coupled with the direct current power bus and the first inverter, the second inverter having a second multi-phase output and a plurality of second switches, the first switches of the first inverter and the second switches of the second inverter being arranged symmetrically with respect to the centerline; and
one or more processors configured to:
cause the first buck switch and the second buck switch to switch according to a pulse width modulated switching scheme so that the first buck switch is pulse width modulated to generate a first buck common mode signal and so that the second buck switch is pulse width modulated to generate a second buck common mode signal that is one hundred eighty degrees out of phase with the first buck common mode signal; and
cause the first switches and the second switches to switch in accordance with a pulse width modulated switching scheme so that the first switches of the first inverter are pulse width modulated to generate a first common mode signal and so that the second switches of the second inverter are pulse width modulated to generate a second common mode signal that is one hundred eighty degrees out of phase with the first common mode signal.

2. The power converter of claim 1, wherein the first multi-phase output is a three-phase output and the second multi-phase output is a three-phase output.

3. The power converter of claim 1, wherein the first inverter is electrically coupled with the second inverter in series.

4. The power converter of claim 3, wherein the first inverter has an outer rail and an inner rail and the second inverter has an outer rail and an inner rail, the inner rail of the first inverter and the inner rail of the second inverter being electrically connected so as to electrically couple the first inverter and the second inverter in series.

5. The power converter of claim 4, wherein the outer rail of the first inverter is electrically connected to a positive direct current-link (DC-link) of the direct current power bus and the outer rail of the second inverter is electrically connected to a negative DC-link of the direct current power bus, and wherein a first inductor is positioned along the positive DC-link and a second inductor is positioned along the negative DC-link.

6. The power converter of claim 1, wherein the first inverter is electrically coupled with the second inverter in parallel.

7. The power converter of claim 6, wherein the first inverter has an outer rail and an inner rail and the second inverter has an outer rail and an inner rail, and
wherein a first positive DC-link of the direct current power bus is electrically connected with the outer rail of the first inverter and a second positive DC-link of the direct current power bus is electrically connected to the inner rail of the second inverter, the first positive DC-link and the second positive DC-link being electrically connected at a positive DC-link node, and
wherein a first negative DC-link of the direct current power bus is electrically connected with the inner rail of the first inverter and a second negative DC-link of the direct current power bus is electrically connected to the outer rail of the second inverter, the first negative DC-link and the second negative DC-link being electrically connected at a negative DC-link node.

8. The power converter of claim 7, wherein a first inductor is positioned along the first positive DC-link and a second inductor is positioned along the second negative DC-link, the first inductor and the second inductor are symmetrically arranged.

9. The power converter of claim 7, wherein a first inductor is positioned along the first positive DC-link, a second inductor is positioned along the second negative DC-link, a third inductor is positioned along the second positive DC-link, and a fourth inductor is positioned along the first negative DC-link, the first inductor and the second inductor are symmetrically arranged and the third inductor and the fourth inductor are symmetrically arranged.

10. The power converter of claim 7, wherein a positive external DC-link of the direct current power bus is electrically connected to the positive DC-link node, and a negative external DC-link of the direct current power bus is electrically connected to the negative DC-link node, and wherein a first inductor is positioned along the positive external DC-link and a second inductor is positioned along the negative external DC-link, the first inductor and the second inductor are symmetrically arranged.

11. The power converter of claim 10, wherein a DC-link spans between and electrically connects the positive external DC-link and the negative external DC-link, and wherein the first inductor is positioned along the positive external DC-link between the positive DC-link node and where the DC-link electrically connects to the positive external DC-link, and wherein the second inductor is positioned along the negative external DC-link between the negative DC-link node and where the DC-link electrically connects to the negative external DC-link.

12. The power converter of claim 11, wherein a DC-link capacitor is positioned along the DC-link.

13. The power converter of claim 1, wherein the first inverter and the second inverter are both current source inverters.

14. The power converter of claim 1, wherein the direct current power bus is electrically coupled with a power source, wherein the power source is a current source.

15. The power converter of claim 1, wherein the first multi-phase output and the second multi-phase output are electrically coupled with an electric machine.

16. The power converter of claim 15, wherein the electric machine is a component of an electric propulsion assembly of an aircraft, the electric machine being mechanically coupled with a fan for driving the fan to produce thrust for the aircraft.

17. The power converter of claim 16, wherein the electric machine is a six-phase electric machine.

18. The power converter of claim 1, wherein the first inverter and the second inverter each have an outer rail, an inner rail, a first leg, a second leg, and a third leg each spanning between the outer rail and the inner rail, the inner rail of the first inverter being closer to the centerline than the outer rail of the first inverter and the inner rail of the second inverter being closer to the centerline than the outer rail of the second inverter, and wherein the first switches and the second switches each include a first switch and a fourth switch positioned along the first leg of the first inverter and the second inverter, respectively, a third switch and a sixth switch positioned along the second leg of the first inverter and the second inverter, respectively, and a fifth switch and a second switch positioned along the third leg of the first inverter and the second inverter, respectively, and wherein the first, third, and fifth switches of the first switches are positioned closer to the outer rail of the first inverter than the fourth, sixth, and second switches of the first switches, and the first, third, and fifth switches of the second switches are positioned closer to the outer rail of the second inverter than the fourth, sixth, and second switches of the second switches.

19. A propulsion system, comprising:

a direct current power bus;

a power source electrically coupled with the direct current power bus;

an electric propulsion assembly having a fan and an electric machine mechanically coupled with the fan;

a power converter defining a centerline, the power converter comprising:

a buck stage having a first buck switch and a second buck switch arranged symmetrically with one another with respect to the centerline; and a boost stage electrically coupled with the buck stage, the boost stage comprising:

a first inverter electrically coupled with the direct current power bus and having a first multi-phase output electrically coupled with the electric machine and a plurality of first switches driven by respective first gates;

a second inverter electrically coupled with the direct current power bus and the first inverter, the second inverter having a second multi-phase output electrically coupled with the electric machine and a plurality of second switches driven by respective second gates, the first switches of the first inverter and the second switches of the second inverter being arranged symmetrically with respect to the centerline; and one or more processors configured to:

cause the first buck switch and the second buck switch to switch according to a pulse width modulated switching scheme so that the first buck switch is pulse width modulated to generate a first buck common mode signal and so that the second buck switch is pulse width modulated to generate a second buck common mode signal that is one hundred eighty degrees out of phase with the first buck common mode signal; and cause the first switches and the second switches to switch in a pulse width modulated switching scheme so that the first switches of the first inverter are pulse width modulated to generate a first common mode signal and so that the second switches of the second inverter are pulse width modulated to generate a second common mode signal that is one hundred eighty degrees out of phase with the first common mode signal.

* * * * *